US007649701B2

(12) United States Patent
Prendergast et al.

(10) Patent No.: US 7,649,701 B2
(45) Date of Patent: Jan. 19, 2010

(54) MAGNETICALLY ACTIVATED SWITCH ASSEMBLY

(75) Inventors: Jonathon R. Prendergast, Newport Beach, CA (US); Charles R. Patton, III, Murrieta, CA (US)

(73) Assignee: Norotos, Inc., Santa Ana, CA (US)

( * ) Notice: Subject to any disclaimer, the term of this patent is extended or adjusted under 35 U.S.C. 154(b) by 446 days.

(21) Appl. No.: 11/743,658

(22) Filed: May 2, 2007

(65) Prior Publication Data

US 2008/0272868 A1 Nov. 6, 2008

(51) Int. Cl.
*G02B 7/02* (2006.01)
*H01H 9/00* (2006.01)

(52) U.S. Cl. ........................... 359/815; 359/409; 2/6.2; 2/6.6; 2/422; 335/205; 335/207

(58) Field of Classification Search ......... 335/205–207; 2/6.1–6.7; 359/409, 815
See application file for complete search history.

(56) References Cited

U.S. PATENT DOCUMENTS

| | | | | |
|---|---|---|---|---|
| 5,331,684 | A * | 7/1994 | Baril et al. | 2/6.2 |
| 5,339,464 | A * | 8/1994 | Dor | 2/6.2 |
| 5,408,086 | A * | 4/1995 | Morris et al. | 250/214 VT |
| 5,506,730 | A * | 4/1996 | Morley et al. | 359/815 |
| 5,857,599 | A * | 1/1999 | Palmer | 224/181 |
| 6,472,776 | B1 * | 10/2002 | Soto et al. | 307/400 |
| 6,862,748 | B2 * | 3/2005 | Prendergast | 2/422 |
| 7,504,918 | B2 * | 3/2009 | Prendergast et al. | 335/205 |
| 2006/0290451 | A1 | 12/2006 | Prendergast et al. | |
| 2007/0012830 | A1 | 1/2007 | Prendergast | |

* cited by examiner

*Primary Examiner*—Ramon M Barrera
(74) *Attorney, Agent, or Firm*—Christie, Parker & Hale, LLP.

(57) ABSTRACT

A magnetically activated switch assembly is provided. The magnetically activated switch assembly includes a magnet and a magnetic circuit. The magnetic circuit includes a magnetically activated switch, a first set of flux conductors, and a second set of flux conductors. The first set of flux conductors has first flux conductor flanges adapted to conduct flux from ends of the magnet. The second set of flux conductors is slidingly positioned relative to the first set of flux conductors and is adapted to conduct flux from the first set of flux conductors to the magnetically activated switch. The first set of flux conductors are adapted to rotate clockwise or counter-clockwise and to tilt up or down. The first magnetic circuit is adapted to conduct flux to activate the magnetically activated switch only when the first flux conductor flanges are rotationally aligned with ends of the magnet and tilted to an operational position.

69 Claims, 16 Drawing Sheets

MAGNETICALLY ACTIVATED SWITCH ASSEMBLY

BACKGROUND OF THE INVENTION

1. Field of the Invention

The present invention relates generally to a magnetically activated switch assembly, and more particularly, to a magnetically activated switch assembly in a helmet mount for turning night vision goggles on and off.

2. Description of Related Art

A magnetically activated switch assembly in a helmet mount for turning night vision goggles on and off is known in the art. Conventional magnetically activated switch assemblies utilize gravity in order to turn night vision goggles on and off. Such gravity controlled magnetically activated switch assemblies could cause integrated night vision goggles to improperly turn off when the night vision goggle apparatus is turned upside down. A non-gravity controlled magnetically activated switch assembly has been developed and is disclosed in U.S. Patent Publication No. 2006/0290451, which was integrated into a monorail mount disclosed in U.S. Patent Publication No. 2007/0012830, both references of which are herein incorporated by reference.

U.S. Patent Publication No. 2006/0290451 discloses a non-gravity controlled magnetically activated switch assembly for integration into a helmet mount for turning night vision goggles on and off. The disclosed magnetically activated switch assembly includes a magnet with conductive flux members leading to a reed switch. When the conductive flux members line up with the north and south poles of the magnet, the reed switch turns on, which provides a current path to power the night vision goggles.

The disclosed magnetically activated switch assembly also includes several air gaps between conductive flux members. The air gaps increase the reluctance of the magnetic flux path. With a higher reluctance magnetic flux path, the magnetically activated switch assembly is less effective because a more sensitive reed switch must be used. If the reed switch is too sensitive, the night vision goggles could be activated by the Earth's magnetic field or other environmental magnetic fields such as that caused by nearby power lines.

Accordingly, there is a need for an improved magnetically activated switch assembly for use in helmet mounted night vision goggles with a lower reluctance magnetic flux path. Such an improved magnetically activated switch assembly would ensure that the night vision goggles are activated only in particular predetermined positions and are therefore more reliable. Furthermore, there is a need for an improved magnetically activated switch assembly that allows the night vision goggles to remain on in predetermined positions and turns the night visions goggles off in other predetermined positions.

SUMMARY OF THE INVENTION

A magnetically activated switch assembly is provided having a magnet and a first magnetic circuit. The magnet has a first magnet end and a second magnet end. The first magnetic circuit includes a magnetically activated switch, a first set of flux conductors, and a second set of flux conductors. The first set of flux conductors have first flux conductor flanges adapted to conduct flux from the first magnet end and the second magnet end. The second set of flux conductors are slidingly positioned relative to the first set of flux conductors and are adapted to conduct flux from the first set of flux conductors to the magnetically activated switch. The first set of flux conductors are adapted to rotate clockwise or counter-clockwise and the first magnetic circuit is adapted to conduct flux to activate the magnetically activated switch only when the first flux conductor flanges are rotationally aligned with the first magnet end and the second magnet end.

In an exemplary embodiment of the present invention, the magnetically activated switch assembly is adapted to tilt between a lower tilt position and an upper tilt position. In addition, the magnet is adapted to remain radially adjacent the first flux conductor flanges as the magnetically activated switch assembly is tilted between the lower tilt position and the upper tilt position. Also, the magnet is adapted to move closer to the first flux conductor flanges as the magnetically activated switch assembly is rotated to a flip-down position. Furthermore, the magnet is adapted to move farther from the first flux conductor flanges as the magnetically activated switch assembly is rotated to a flip-up or stow position.

In an exemplary embodiment of the present invention, the lower tilt position is 5 degrees below a centerline tilt position and the upper tilt position is 13 degrees above the centerline tilt position.

In an exemplary embodiment of the present invention, the first flux conductor flanges are located in a center the first set of flux conductors such that a maximum reluctance of the first magnetic circuit is minimized as the second set of flux conductors are slidingly positioned between ends of the first set of flux conductors.

In an exemplary embodiment of the present invention, a shunt ring is positioned proximate the magnet such that as the magnetically activated switch assembly rotates to a flip-up or stow position, the magnet moves along an axis of the shunt ring to a position inside the shunt ring, and as the magnetically activated switch assembly rotates to a flip-down position, the magnet moves along the axis of the shunt ring to a position outside the shunt ring radially adjacent the first flux conductor flanges.

In an exemplary embodiment of the present invention, the shunt ring is a second magnetic circuit having a high magnetic permeability.

In an exemplary embodiment of the present invention, the magnetically activated circuit assembly further includes a magnet carrier housing the magnet and an actuator shaft attached to the magnet carrier. As the magnetically activated switch assembly rotates to a flip-up position, the actuator shaft and magnet carrier move along the axis of the shunt ring such that the magnet carrier is positioned inside the shunt ring, and as the magnetically activated switch assembly rotates to a flip-down position, the actuator shaft and magnet carrier move along the axis of the shunt ring such that the magnet carrier is positioned outside the shunt ring radially adjacent the first flux conductor flanges.

In an exemplary embodiment of the present invention, the magnet carrier is made out of a low magnetic permeability metal or plastic, such as aluminum, nylon or a polyimide thermoplastic resin, or any other low magnetic permeability material.

In an exemplary embodiment of the present invention, the magnetically activated switch assembly further includes a helmet block having a cam shaped channel and a coil spring coupled to the magnet carrier and to an end of the magnetically activated switch assembly. The actuator shaft has a flat edge at an end for fitting into the channel and the coil spring biases the magnet carrier toward the helmet block.

In an exemplary embodiment of the present invention, the second set of flux conductors include upper transfer conductors and lower transfer conductors. The upper transfer conductors contact or are in close proximity with the lower transfer conductors, and the lower transfer conductors are in close proximity to the magnetically activated switch. The first set of flux conductors include vertical shoes and monorail strip conductors. The first flux conductor flanges extend from a center of the vertical shoes. The vertical shoes are positioned on top of the monorail strip conductors. The monorail strip conductors are T-shaped or dovetail shaped. The upper transfer conductors are adapted to slide along bottom portions of the monorail strip conductors.

In an exemplary embodiment of the present invention, the first set of flux conductors and the second set of flux conductors are formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

In an exemplary embodiment of the present invention, the magnetically activated switch assembly is integrated into a helmet mount for night vision goggles such that the magnetically activated switch assembly turns on the night vision goggles only when the night vision goggles are in a flip-down position and the first flux conductor flanges are rotationally aligned with poles of the magnet.

In an exemplary embodiment of the present invention, the magnetically activated switch is a reed switch.

A magnetically activated switch assembly is alternatively provided including a first magnet, a second magnet, and a magnetic circuit. The first magnet has a first magnet north end and a first magnet south end. The second magnet has a second magnet north end and a second magnet south end. The magnetic circuit includes a magnetically activated switch, a first set of flux conductors, and a second set of flux conductors. The first set of flux conductors are adapted to conduct flux from the first magnet north end and the second magnet south end to the second set of flux conductors. The second set of flux conductors are slidingly positioned relative to the first set of flux conductors and are adapted to conduct flux from the first set of flux conductors to the magnetically activated switch. The magnetic circuit is adapted to rotate clockwise or counter-clockwise and to activate the magnetically activated switch only when the first set of flux conductors are rotationally aligned with the first magnet north end and the second magnet south end.

In an exemplary embodiment of an alternative of the present invention, the magnetically activated switch assembly further includes a shunt shaft. The first magnet south end and the second magnet north end contact or are in close proximity to the shunt shaft.

In an exemplary embodiment of an alternative of the present invention, the shunt shaft has a high magnetic permeability.

In an exemplary embodiment of an alternative of the present invention, the magnetically activated switch is a reed switch.

In an exemplary embodiment of an alternative of the present invention, the first set of flux conductors and the second set of flux conductors are formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

In an exemplary embodiment of an alternative of the present invention, the magnetic circuit is adapted to tilt between a lower tilt position and an upper tilt position, and the magnetic circuit is adapted to activate the magnetically activated switch only when the magnetic circuit is in a flip-down position and the first set of flux conductors are rotationally aligned with the first magnet north end and the second magnet south end.

In an exemplary embodiment of an alternative of the present invention, the magnetically activated switch assembly further includes a first magnet shoe connected to the first magnet north end, a second magnet shoe connected to the second magnet south end, a first vertical transfer conductor contacting or in close proximity with the first magnet shoe, and a second vertical transfer conductor contacting or in close proximity with the second magnet shoe. The first set of flux conductors are adapted to be in close proximity with the first vertical transfer conductor and the second vertical transfer conductor only when the first set of flux conductors are rotationally aligned with the first vertical transfer conductor and the second vertical transfer conductor, and the magnetic circuit is between the lower tilt position and the upper tilt position. The first magnet shoe and the second magnet shoe are configured to obtain the lower tilt position and the upper tilt position.

In an exemplary embodiment of an alternative of the present invention, the second set of flux conductors include upper transfer conductors and lower transfer conductors. The lower transfer conductors are in close proximity to the magnetically activated switch. The upper transfer conductors contact or are in close proximity to the lower transfer conductors. The first set of flux conductors include monorail strip conductors, vertical shoes, and rotary conductors. The monorail strip conductors contact or are in close proximity to the upper transfer conductors and are T-shaped or dovetail shaped. The upper transfer conductors are adapted to slide along bottom portions of the monorail strip conductors in the second direction. The vertical shoes contact or are in close proximity with a top portion of the monorail strip conductors. The rotary conductors contact or are in close proximity to the vertical shoes. The rotary conductors are in close proximity to the first vertical transfer conductor and the second vertical transfer conductor only when the rotary conductors are rotationally aligned with the first vertical transfer conductor and the second vertical transfer conductor and the magnetic circuit is in a flip-down position.

An additional embodiment is to add a shunt bar such that when the rotary conductors are in a flip-up position, the rotary conductors align with this shunt bar to further decrease the magnetic flux conducted to the magnetic switch.

In an exemplary embodiment of an alternative of the present invention, the magnetically activated switch assembly is integrated into a helmet mount for night vision goggles such that the magnetically activated switch assembly turns on the night vision goggles only when the night vision goggles are in a flip-down position and the rotary conductors are rotationally aligned with the first vertical transfer conductor and the second vertical transfer conductor.

A helmet mount assembly is provided having a magnetically activated switch assembly as disclosed above. The helmet mount assembly includes a helmet block having a cam shaped channel and an axis hole parallel to a first direction. In addition, the helmet mount assembly includes a chassis mounted to the helmet block by a shaft inserted through the axis hole. The chassis has a rotating member that rotates about an axis parallel to a second direction. The second direction is perpendicular to the first direction. Furthermore, the helmet mount assembly includes a monorail assembly connected to the chassis. The monorail assembly includes the magnetically activated switch assembly.

Alternatively, A helmet mount assembly is provided having a magnetically activated switch assembly as disclosed above. The helmet mount assembly includes a helmet block that has an axis hole parallel to a first direction and said helmet block contains magnets with flux conductors conducting the magnetic flux to flux conductors in a chassis mounted to the helmet block by a shaft inserted through the axis hole. The chassis has a rotating member that rotates about an axis parallel to a second direction. The second direction is perpendicular to the first direction. This rotating member contains additional flux conductors. Furthermore, the helmet mount assembly includes a monorail assembly connected to the chassis. The monorail assembly includes flux conductors to conduct the magnetic flux from the magnets in the helmet block to the magnetically activated switch assembly.

DETAILED DESCRIPTION

Figure 1:
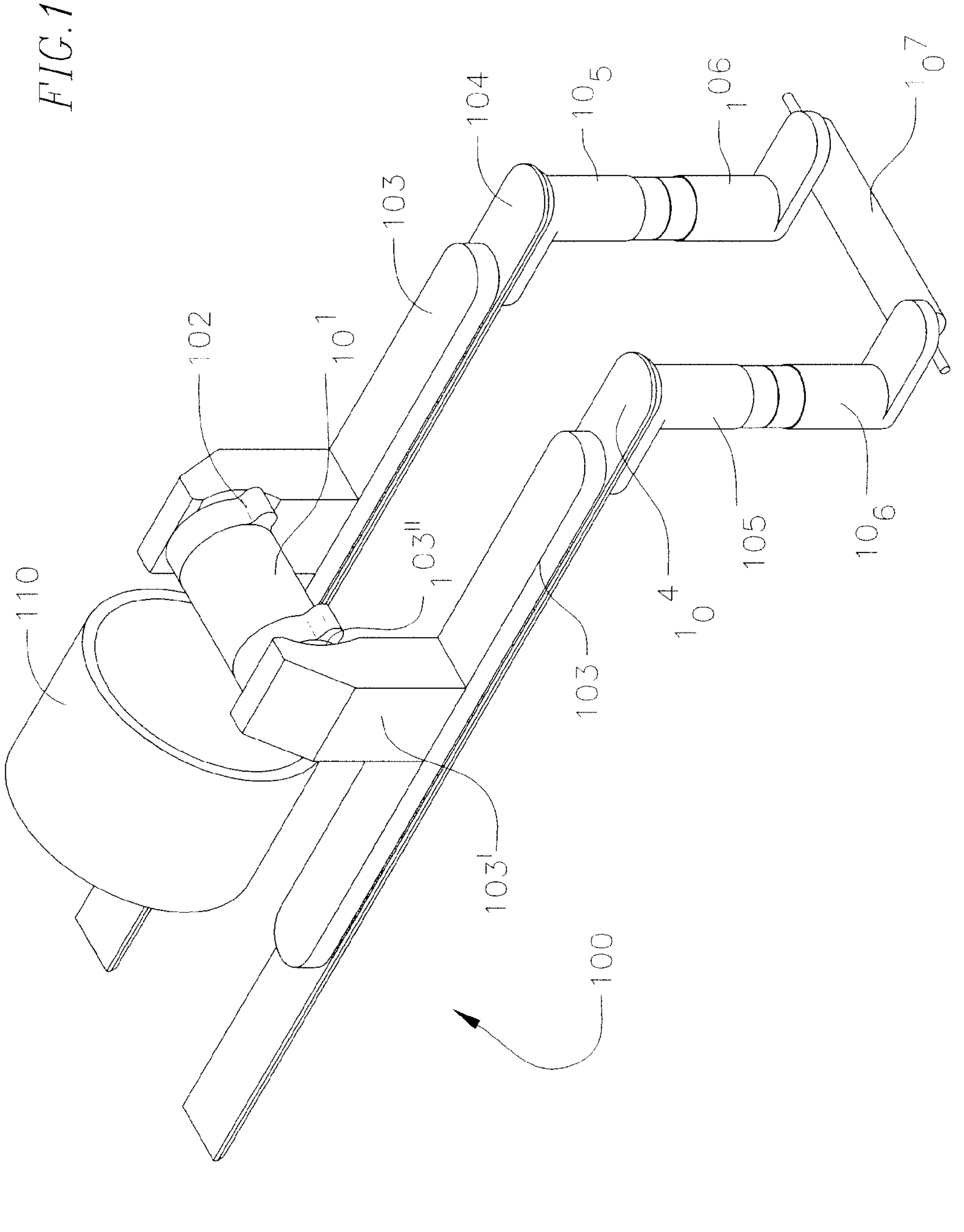
FIG. 1 is a perspective view of a magnetically activated switch assembly according to an exemplary embodiment of the present invention.
Figure 3:
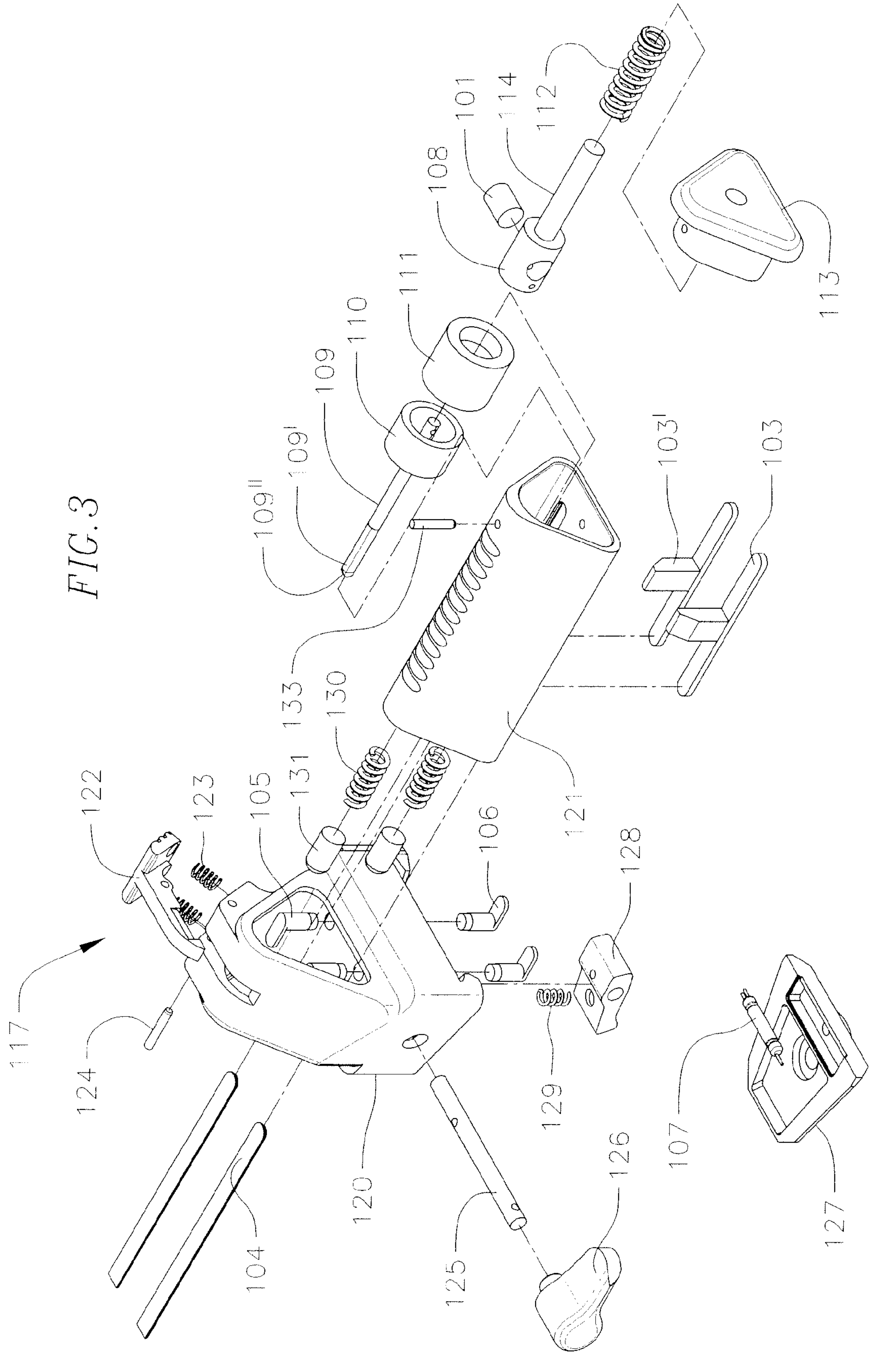
FIG. 3 is a perspective exploded view of the monorail assembly of FIG. 2 integrated with the magnetically activated switch assembly of FIG. 1 according to an exemplary embodiment of the present invention.
Figure 3A:
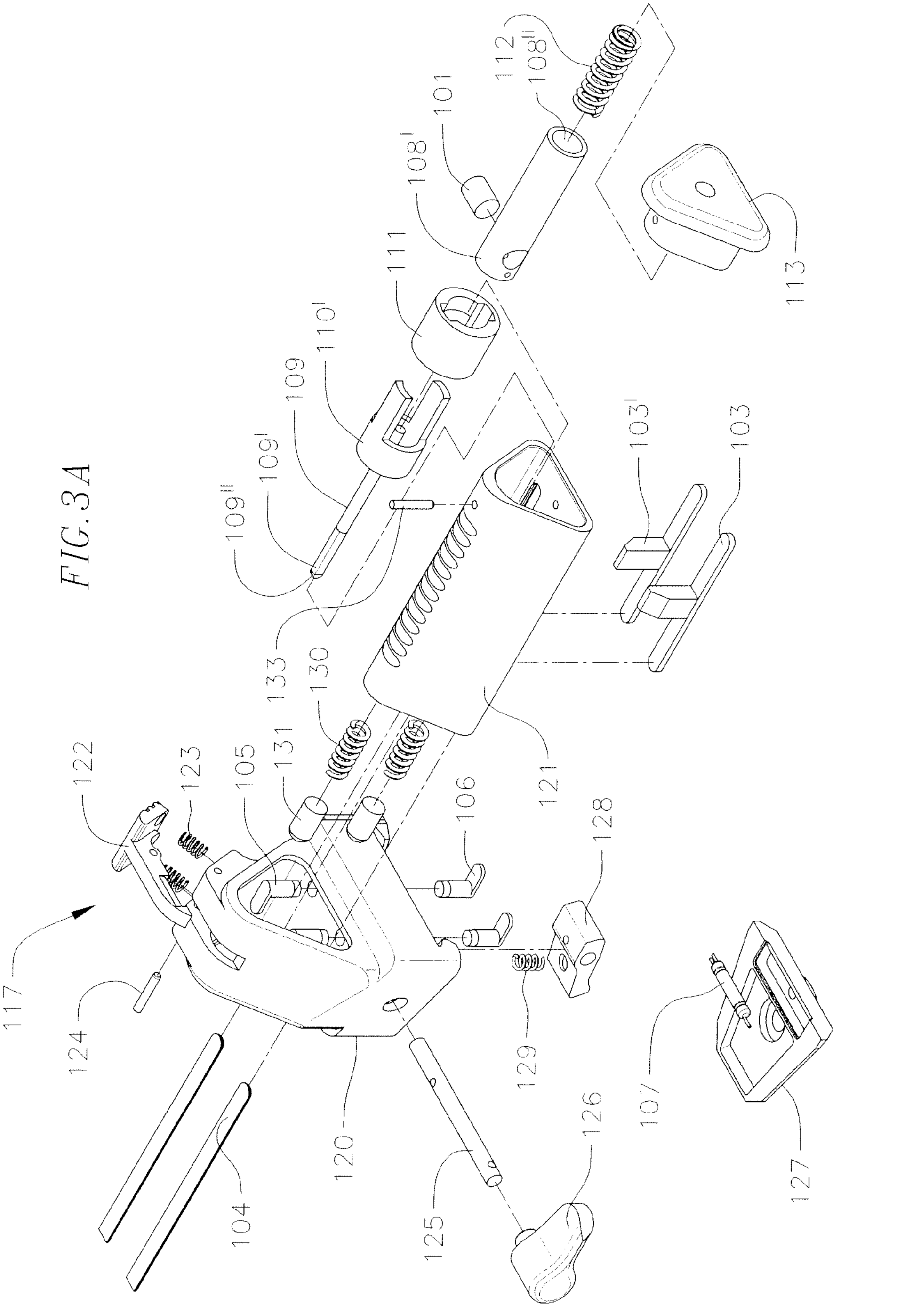
FIG. 3A is a perspective exploded view of the monorail assembly of FIG. 2 integrated with the magnetically activated switch assembly of FIG. 1 according to another exemplary embodiment of the present invention.

FIG. 1 is a perspective view of a magnetically activated switch assembly 100 according to an exemplary embodiment of the present invention. The magnetically activated switch assembly 100 includes a magnet 101 and may additionally include magnet shoes 102 positioned on the north and south poles of the magnet 101. Adjacent the magnet shoes 102 and separated by an air gap are vertical shoes 103. The vertical shoes 103 are positioned above monorail strip conductors 104 and each have a protruding arm 103' that extends adjacent each pole of the magnet 101 to conduct the magnetic flux. The protruding arm 103' may include an indentation 103' when magnet shoes 102 are located on poles of the magnet 101. The monorail strip conductors 104 are T-shaped or dovetail shaped and fit into a channel on the bottom of a monorail 121 (FIG. 3) such that they are positioned above the upper transfer conductors 105, thus allowing the upper transfer conductors 105 to slide along bottom portions of the monorail strip conductors 104. The upper transfer conductors 105 contact or are in close proximity to lower transfer conductors 106. The lower transfer conductors 106 are in close proximity with a reed switch 107 (FIG. 3). Shunt ring 110 provides an alternate path for the flux from magnet 101 when magnet 101 is positioned within shunt ring 110. In an alternate construction, shunt ring 110'(FIG. 3A) has finger extensions such that when magnet 110 rotates out of alignment with flux shoes 103', a low reluctance shunt path forms through fingers of shunt ring 110' improving the rate of turn-off of reed switch 107 during that rotation by diverting magnetic flux that was actuating reed switch 107.

The magnet 101, magnet shoes 102, vertical shoes 103, monorail strip conductors 104, upper transfer conductors 105, and lower transfer conductors 106 form a magnetic circuit/flux path between the magnet 101 and the reed switch 107. According to Maxwell's equations, magnetic flux always forms a closed loop. However, the path of the closed loop depends on the reluctance of the materials surrounding the magnet 101. That is, a magnetic circuit/flux path of low reluctance materials may be used to direct magnetic flux in a particular path. The reluctance of a magnetic circuit is proportional to the length of the circuit and is inversely proportional to the magnetic permeability of the material used in the circuit and the cross-sectional area of the circuit.

Accordingly, according to exemplary embodiments of the present invention, the magnet 101 is centrally located along the monorail strip conductor 104 in order to minimize the length of the magnetic circuit/flux path. In addition, the magnet shoes 102, vertical shoes 103, monorail strip conductors 104, upper transfer conductors 105, and lower transfer conductors 106 may be formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability for conducting magnetic flux of the magnet 101.

Mu-metal is nickel-iron alloy annealed in a hydrogen atmosphere for high magnetic permeability. Permalloy is a nickel-iron alloy with high magnetic permeability with a content typically of around 80% nickel and 20% iron. The high magnetic permeability metals for conducting magnetic flux of the magnet 101 should be magnetically "soft" metals such that a magnetic field induced in the metal quickly collapses when the magnet 101 is moved away from or shielded from the magnetic circuit.

Furthermore, according to exemplary embodiments of the present invention, the magnet shoes 102 allow for the minimization of the air gap between the vertical shoes 103 and the north and south poles of the magnet 101. When the magnetic circuit is formed of AISI 12L14 carbon steel, the air gap with the magnet shoes 102 may be around 0.020 inches. However, without the magnet shoes 102, the air gap may be around 0.040 inches. In order to keep the reluctance of the magnetic circuit/flux path to the reed switch low enough for effectiveness, the air gap should be less than 0.060 inches. However, larger air gaps can be used if a stronger magnet 101 is used or lower reluctance materials are used for the magnetic circuit/flux path.

As depicted in FIG. 1, the upper transfer conductors 105 are positioned at one end of the monorail strip conductors 104. The reluctance of the magnetic circuit/flux path is maximized when the upper transfer conductors 105 are positioned at the ends of the monorail strip conductors 104 and is minimized when the upper transfer conductors 105 are positioned immediately below the protruding arm 103' of the vertical shoes 103. However, even when the upper transfer conductors 105 are positioned at ends of the monorail strip conductors 104 where reluctance of the magnetic circuit is at a maximum, the reluctance is low enough for the magnetic circuit to sufficiently conduct magnetic flux to the reed switch 107.

Figure 2:
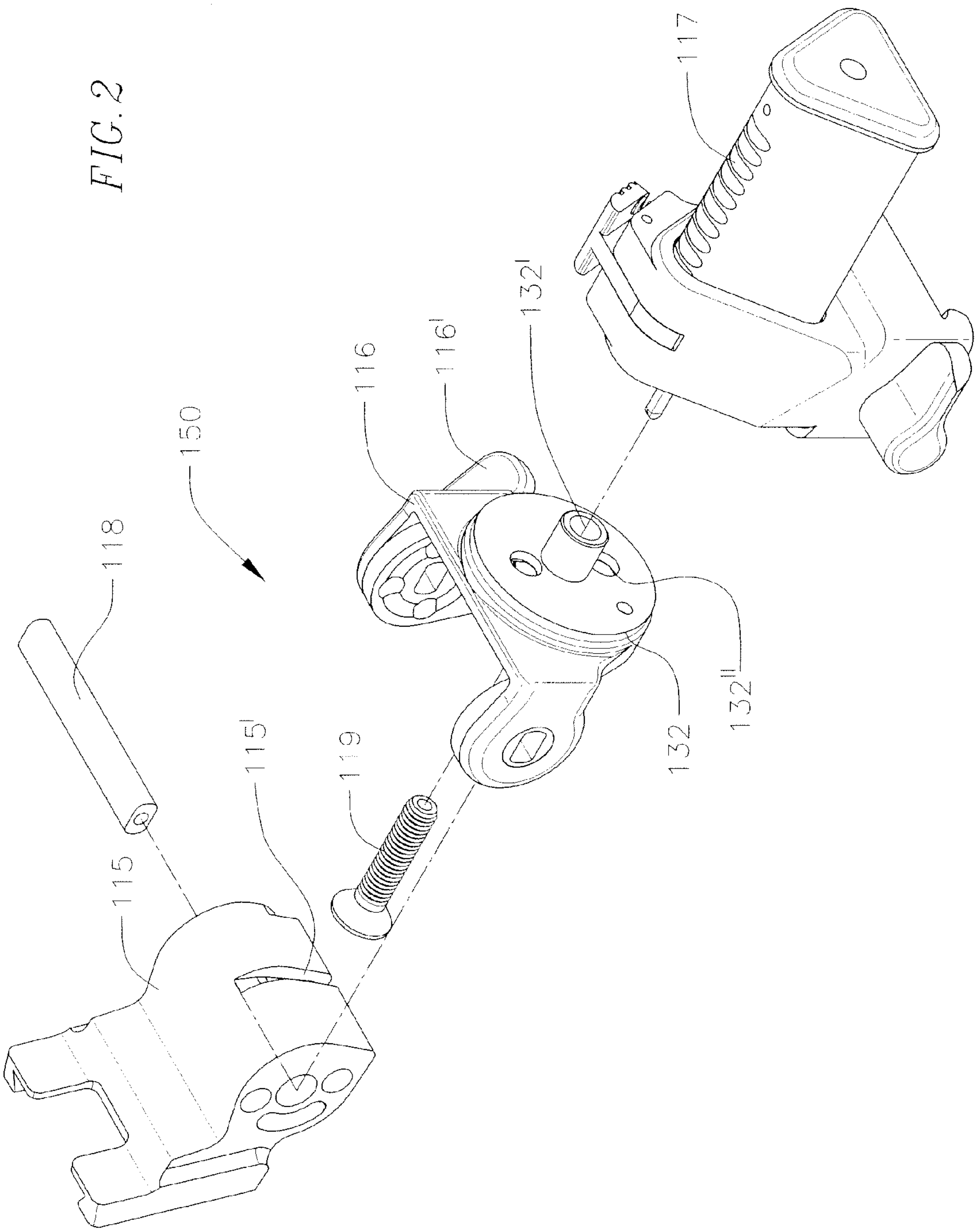
FIG. 2 is a perspective exploded view of a portion of a monorail helmet mount for night vision goggles with the magnetically activated switch assembly of FIG. 1 according to an exemplary embodiment of the present invention.

FIG. 2 is a perspective exploded view of a portion of a monorail helmet mount 150 for night vision goggles with the magnetically activated switch assembly 100 according to an exemplary embodiment of the present invention. The monorail helmet mount 150 includes a helmet block 115, chassis assembly 116, and monorail assembly 117. The helmet block 115 includes a cam shaped channel 115'. The chassis assembly 116 includes a pivot lever 116' for tilting the chassis assembly 116. The chassis assembly 116 is connected to the helmet block 115 at shaft 118. The chassis assembly 116 includes a bearing face 132 with an axis hole 132' and holes 132". The bearing face 132 allows the monorail assembly 117 to be rotated. The monorail assembly 117 is connected to the chassis assembly 116 by bolt 119.

FIG. 3 is a perspective exploded view of the monorail assembly 117 integrated with the magnetically activated switch assembly 100 according to an exemplary embodiment of the present invention. The magnet 101 is enclosed in a magnet carrier/housing 108. The magnet carrier 108 may be formed of a low magnetic permeability metal or plastic such as aluminum, nylon or a polyimide thermoplastic resin such as Ultem®. Ultem® is a registered trademark of General Electric. An actuator shaft 109 is positioned through a shunt ring 110 and shunt ring housing 111 and is connected to the magnet carrier 108. The actuator shaft 109 has a flat edge 109' at an end for fitting into a channel 115' of the helmet block 115 (FIG. 2). The shunt ring 110 is enclosed in the shunt ring housing 111 and is located adjacent the magnet 101. The shunt ring 110 is formed of a material with high magnetic permeability. Opposite the actuator shaft 109 on the opposite side of the magnet carrier 108 is a coil spring 112. The coil spring 112 biases the actuator shaft 109 such that the end 109" of the actuator shaft 109 always makes contact within the channel 115' of the helmet block 115. The coil spring 112 is connected at one end to the magnet carrier 108 and at another end to the monorail end cap 113. An additional shaft 114 may be connected to the magnet carrier 108 to help center the coil spring 112. In an alternative exemplary embodiment (FIG. 3A), the shunt ring 110' may have shunt fingers/extensions that shunt the magnetic flux when monorail assembly 117 is rotated clockwise or counter-clockwise. The shunt fingers/extensions result in faster reduction of magnetic flux across the first set of magnetic conductors with regard to rotation of the conductors to the magnet.

The monorail assembly 117 further includes a carriage 120 connected to a monorail 121. The carriage 120 includes a fore/aft lever 122 biased by springs 123 and held to the carriage 120 by a pin 124 for allowing the monorail 121 to be locked in a particular position within the carriage 120. The carriage 120 also includes a shaft 125 and a release lever 126 for allowing a night vision goggle apparatus with a goggle dovetail assembly 127 to be connected to a bottom portion of the carriage 120. In addition, the carriage 120 includes a lock 128 and a biasing spring 129 for locking a night vision goggle apparatus to the bottom of the carriage 120. The shaft 125 slides through the lock 128, holding the lock 128 in place.

Furthermore, the carriage 120 includes lower and upper transfer conductors 106, 105. The lower transfer conductors 106 are in close proximity to the reed switch 107 of the goggle dovetail assembly 127. The lower transfer conductors 106 contact or are in close proximity to the upper transfer conductors 105. The upper transfer conductors 105 are adapted to slide along a bottom surface of the monorail strip conductors 104. The monorail strip conductors 104 are T-shaped or dovetail shaped and fit within a channel of the monorail 121. Vertical shoes 103 are positioned above a top, edge portion of the monorail strip conductors 104. The monorail 121 is coupled to springs 130. The springs 130 bias plungers 131 into holes 132" of the bearing face 132. Monorail end cap 113 covers an end of the monorail 121, locked in position by pin 133.

The night vision goggles may be rotated clockwise or counter-clockwise about the axis hole 132' of the bearing face 132, rotated up about shaft 118, or may be rotated both clockwise/counter-clockwise and up. As the night vision goggles are rotated clockwise or counter-clockwise, the vertical shoes 103 rotate around the magnet 101. The magnet 101 remains stationary because the flat edge 109' of the actuator shaft 109 keeps the magnet 101 in place. As the vertical shoes 103 rotate around the magnet 101, the vertical shoes 103 move from an aligned position in which the protruding arms 103' and the magnet shoes 102 are in alignment to an unaligned position in which the protruding arms 103' and the magnet shoes 102 are out of alignment. Thus, as the protruding arms 103' of the vertical shoes 103 are rotated from an aligned position, north/south polarization cannot be effectively delivered to the protruding arms 103' and therefore cannot be effectively delivered to the reed switch 107. Thus, for example, when the first set of conductors is rotated 90° to the magnet, a null position is realized wherein essentially no flux is across the first set of magnetic conductors.

In an exemplary embodiment, when the protruding arms 103' and the magnet shoes 102 are in alignment, the magnetic circuit delivers about 26 gauss (G) to the reed switch 107. However, when the protruding arms 103' are rotated about 90 degrees, the magnetic circuit delivers less than 1 G to the reed switch 107. Thus, as the protruding arms 103' are rotated out of alignment with the north and south poles of the magnet 101, the magnetic flux density at the reed switch 107 drops from about 26 G to less than 1 G, which causes the reed switch 107 to open.

As the night vision goggles are rotated up to a flip-up or stow position about shaft 118, the actuator shaft 109 is biased by the coil spring 112 toward the helmet block 115. Because the helmet block 115 includes a cam shaped channel 115', as the night vision goggles are rotated up to a flip-up or stow position, the actuator shaft 109 is biased by the coil spring 112 to move along the axis of the shunt ring 110 such that the magnet carrier 108 and magnet 101 are positioned within the shunt ring 110.

While the magnet 101 is within the shunt ring 110, the reluctance of the magnetic circuit/flux path to the reed switch 107 is increased due to the increased air gap between the poles of the magnet 101 and the protruding arms 103' of the vertical shoes 103. In addition, the reluctance of the magnetic circuit/flux path through the shunt rung 110 is reduced because the magnet shoes 102 are adjacent inner edges of the shunt ring 110. Thus, while the magnet 101 is within the shunt ring 110, the majority of the magnetic flux propagates through the shunt ring 110 rather than through the magnetic circuit leading to the reed switch 107. As a result, the reed switch 107 will open.

Figure 4A:
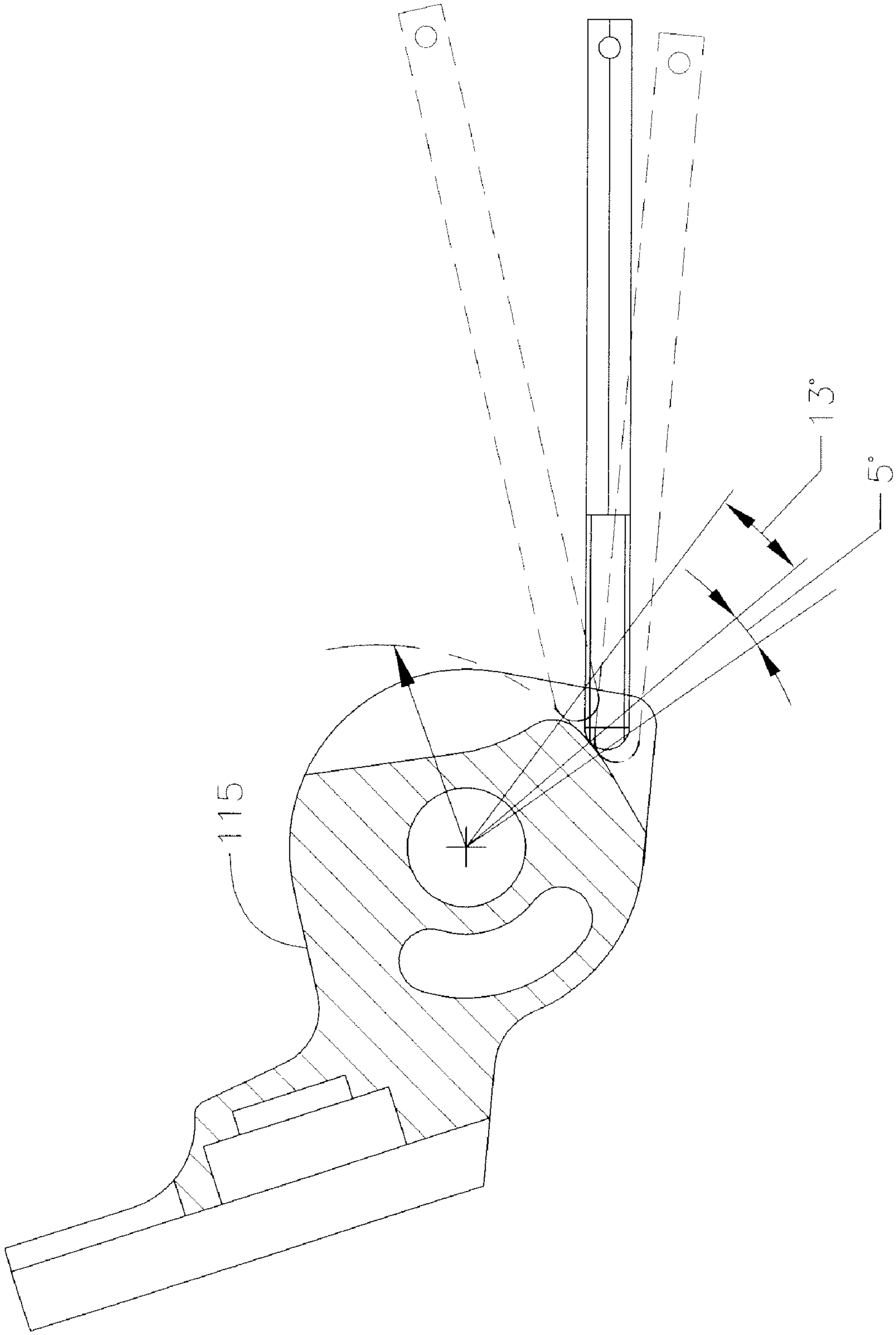
FIG. 4A is a side view partly in cross section of the helmet block of FIG. 2 according to an exemplary embodiment of the present invention.

FIG. 4A is a side view partly in cross section of the helmet block 115 according to an exemplary embodiment of the present invention. The channel 115' of the helmet block 115 is configured such that the actuator shaft 109 does not move in or out along the axis of the shunt ring 110 while the chassis assembly 116 is in a flip-down position and is tilted by pivot lever 116'. In a flip-down position, the chassis assembly 116 is flipped down into a position in which an integrated night vision goggle assembly is in use. In such a configuration, the magnet 101 will remain aligned radially with the vertical shoes 103 while the chassis assembly 116 is tilted. The channel 115' is configured to provide non-movement by the actuator shaft 109 during tilting by forming the helmet block 115 with a set radius in that tilt range. In an exemplary embodiment, the tilt range is 5 degrees downward from a centerline and 13 degrees upward from a centerline, but this can be modified if desired by changing the shape of the channel 115'.

The helmet block 115 is also configured such that when the night vision goggles are put into a flip-up or stow position, the night vision goggles are turned off. Hence, the channel 115' of the helmet block 115 will have a cam shape. That is, when monorail assembly 117 and the chassis 116 are flipped-up, the end 109" of the actuator shaft 109 moves along the channel 115' of the helmet block 115 such that the actuator shaft moves toward the helmet block 115, thus moving the magnet 101 out of alignment with the vertical shoes 103, which turns off the night vision goggles.

Figure 4B:
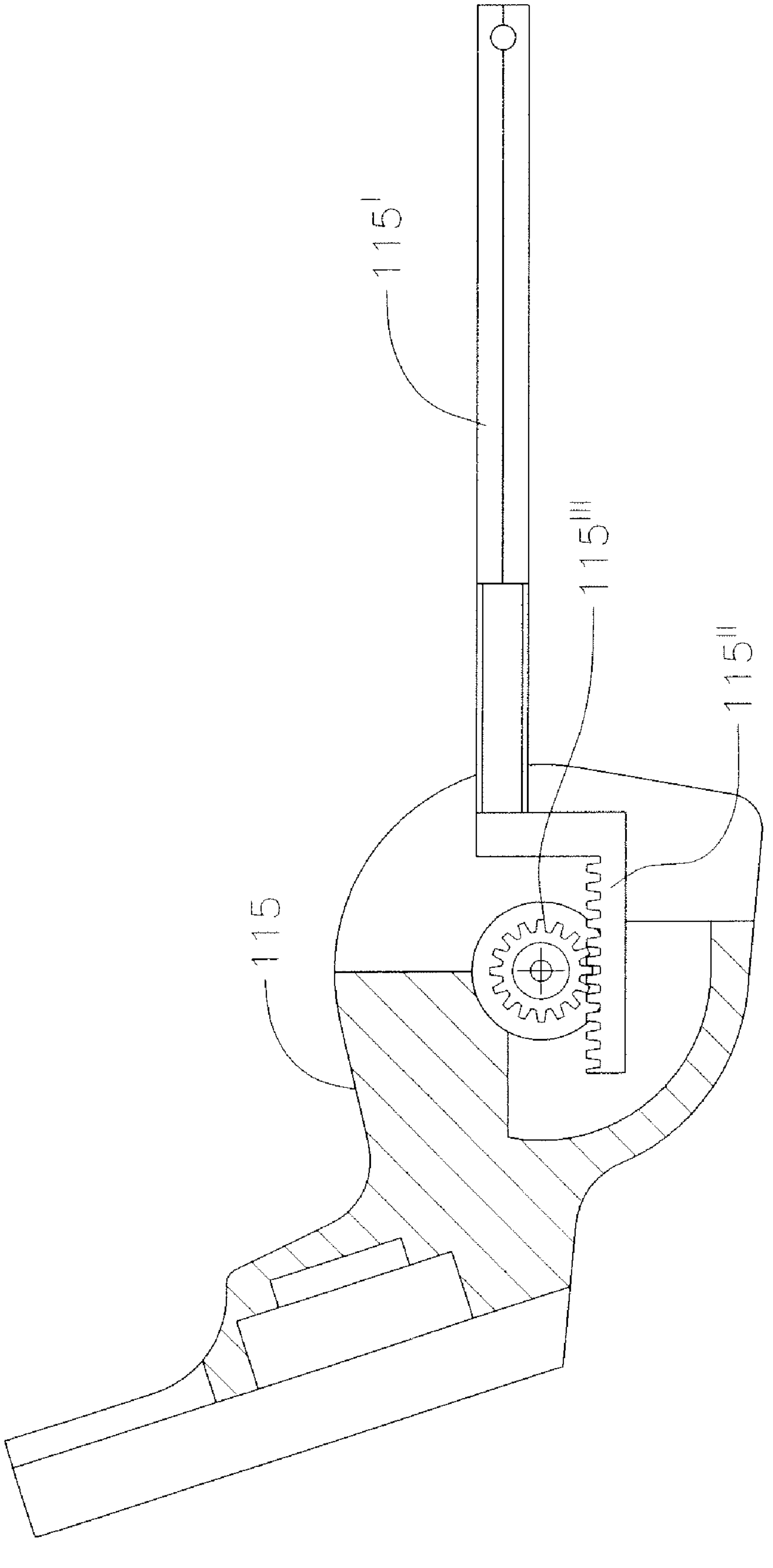
FIG. 4B is a side view partly in cross section of the helmet block of FIG. 2 according to another exemplary embodiment of the present invention.

FIG. 4B is a side view partly in cross section of the helmet block of FIG. 2 according to another exemplary embodiment of the present invention. As described above, the actuator shaft 109 may have an end 109" for fitting in a channel 115' of the helmet block 115. Alternatively, the actuator shaft 109 could include a gear rack 115" at an end for allowing the actuator shaft to be moved in an out by a gear 115'" fastened to the helmet block 115.

As depicted in FIG. 1 and FIG. 3, the shunt ring 110 is located between the magnet carrier 108 and the helmet block 115. However, in an alternative embodiment, the shunt ring 110 may positioned between the magnet carrier 108 and the monorail end cap 113. In such an embodiment, the channel 115' of the helmet block 115 will have a shape that causes the actuator shaft to move toward the monorail end cap 113 rather than away from it as the night vision goggles are rotated up.

Furthermore, as depicted in FIG. 3, the coil spring 112 biases the magnet carrier 108 and may fit over a shaft 114. However, in an alternative embodiment (see FIG. 3A), a magnet carrier 108' may include a hollow cylindrical extension for allowing the coil spring 112 to fit within the hollow section 108".

Figure 5:
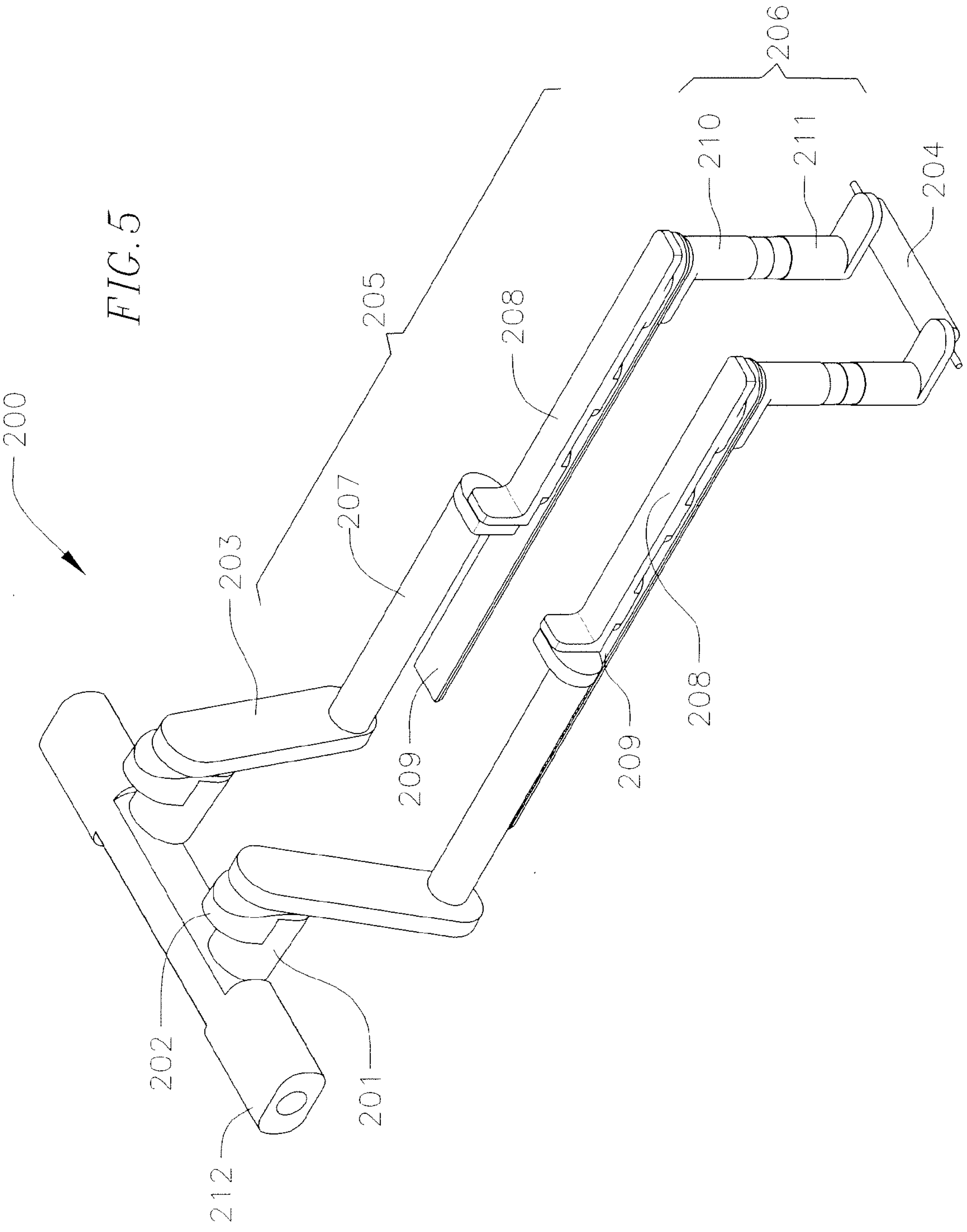
FIG. 5 is a perspective view of a magnetically activated switch assembly according to another exemplary embodiment of the present invention.

FIG. 5 is a perspective view of a magnetically activated switch assembly 200 according to another exemplary embodiment of the present invention. The magnetically activated switch assembly includes first and second magnets 201. The first and second magnets 201 are aligned such that one magnet has an outwardly facing north pole and the other magnet has an outwardly facing south pole. Adjacent the first and second magnets 201 are magnet shoes 202 connected to the outward north and south poles of the first and second magnets 201. Adjacent the magnet shoes 202 and separated by a small air gap are vertical transfer conductors 203. Flux propagated by the vertical transfer conductors 203 are provided to a reed switch 204 (FIG. 9) by first and second sets of flux conductors 205, 206. In addition, shaft 212 provides a low reluctance path between first and second magnets 201.

The first set of flux conductors 205 include transfer pins/rotary conductors 207, vertical shoes 208, and monorail strip conductors 209. The rotary conductors 207 transfer magnetic flux to the vertical shoes 208. The vertical shoes 208 have protruding members extending down a center section extending to the monorail strip conductors 209. The monorail strip conductors 209 contact or are in close proximity to the protruding members of the vertical shoes 208 and extend parallel to the rotary conductors 207. The monorail strip conductors 209 are T-shaped or dovetail shaped. The monorail strip conductors 209 fit into a channel of the monorail 271, allowing the second set of flux conductors 206 to slide along bottom portions of the monorail strip conductors 209.

The second set of flux conductors 206 include upper and lower transfer conductors 210, 211. The upper transfer conductor 210 is adapted to be able to slide along the bottom portions of the monorail strip conductors 209. The upper transfer conductors 210 contact or are in close proximity with the lower transfer conductors 211. The lower transfer conductors 211 are in close proximity with the reed switch 204.

Figure 5A:
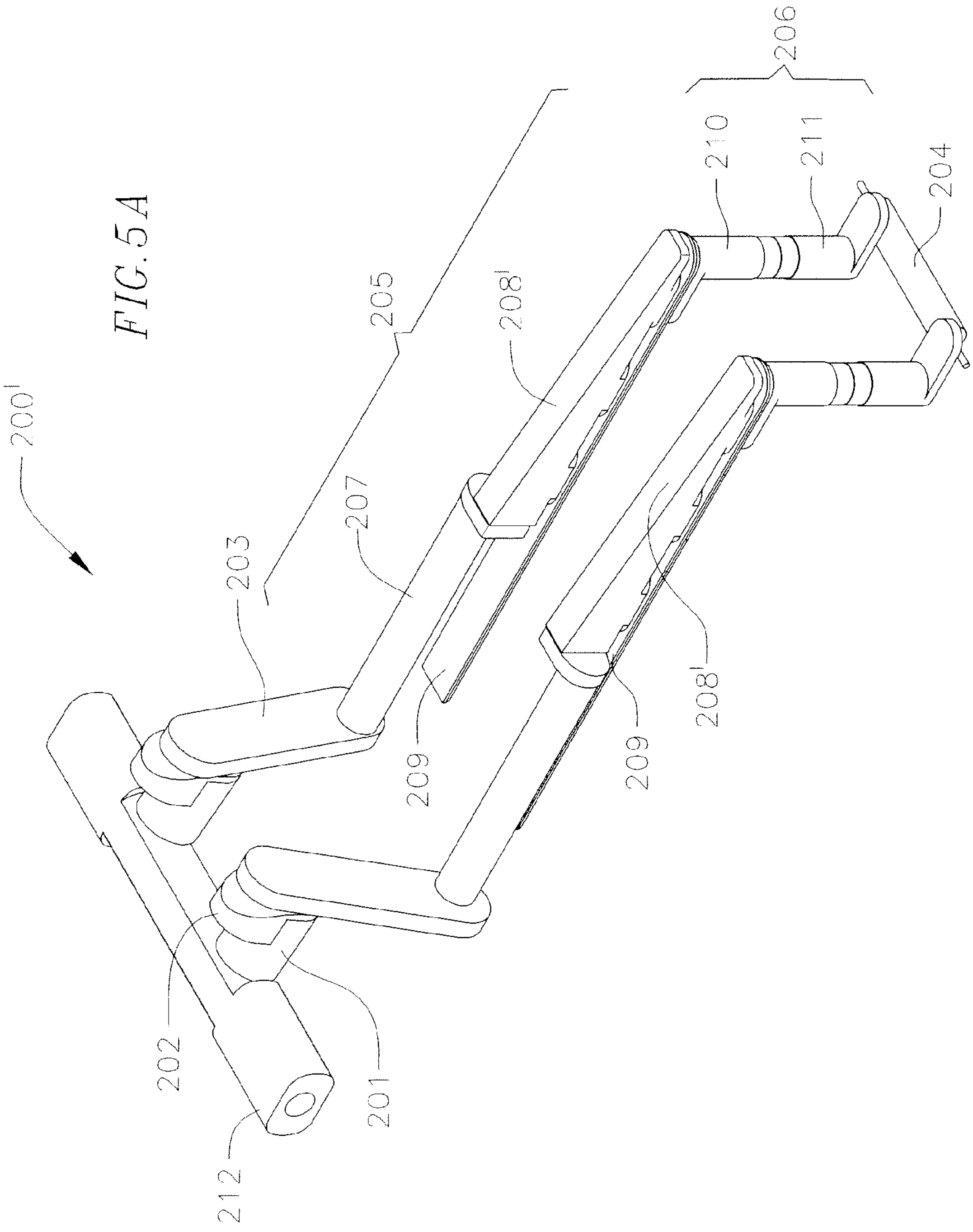
FIG. 5A is a perspective view of a magnetically activated switch assembly according to yet another exemplary embodiment of the present invention.

FIG. 5A is a perspective view of a magnetically activated switch assembly 200'according to yet another exemplary embodiment of the present invention. As depicted in FIG. 5A, the vertical shoes 208' may be tapered. In such an embodiment, the vertical shoes 208' have a lower reluctance due to a reduction of flux density and magnetic saturation of flux conductors 208' and an increase in the cross-sectional area of the circuit. With lower reluctance, the vertical shoes 208' better conduct the magnetic flux.

Figure 6:
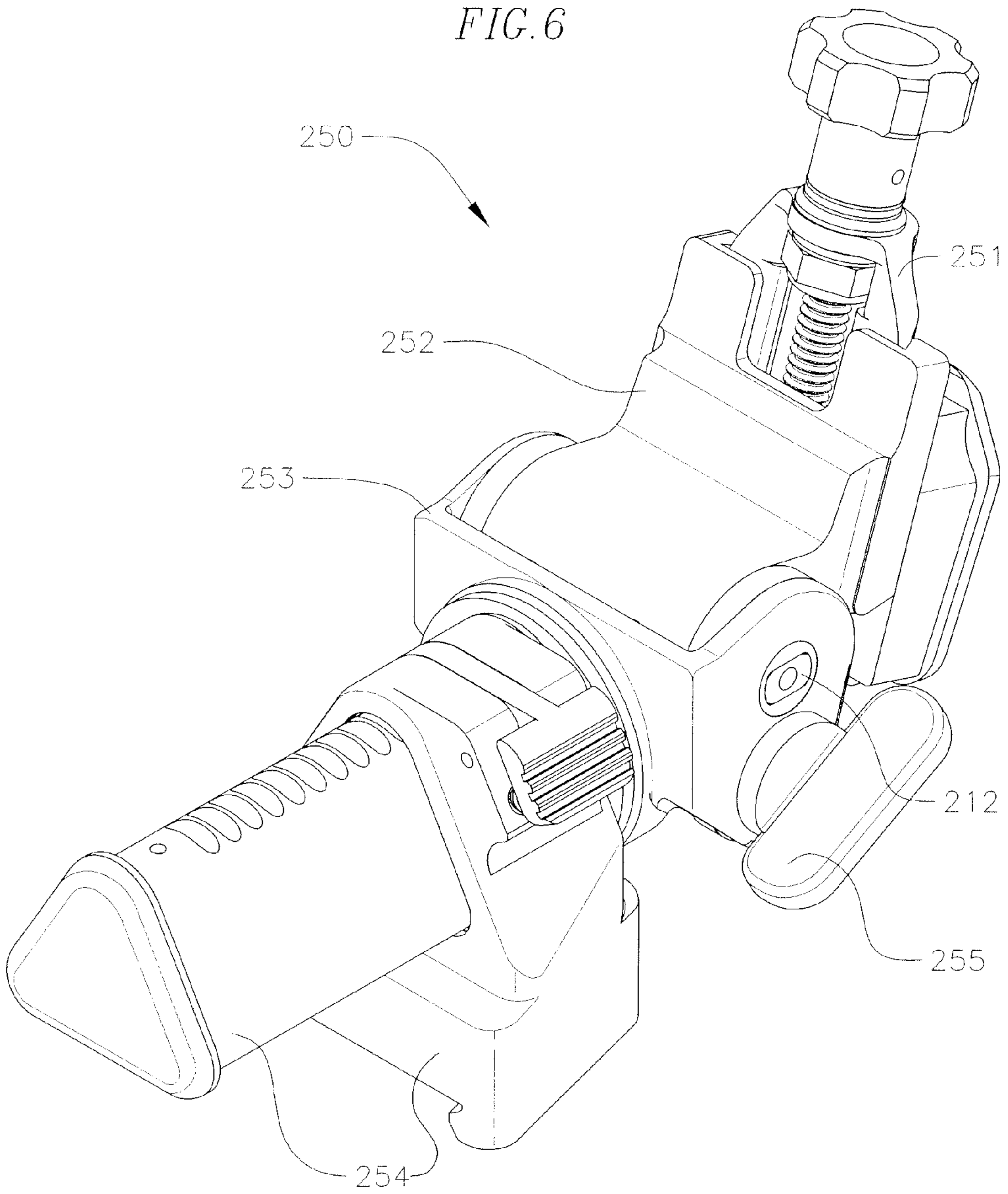
FIG. 6 is a first perspective view of a monorail helmet mount for night vision goggles with the magnetically activated switch assembly of FIG. 5 according to an exemplary embodiment of the present invention.
Figure 7:
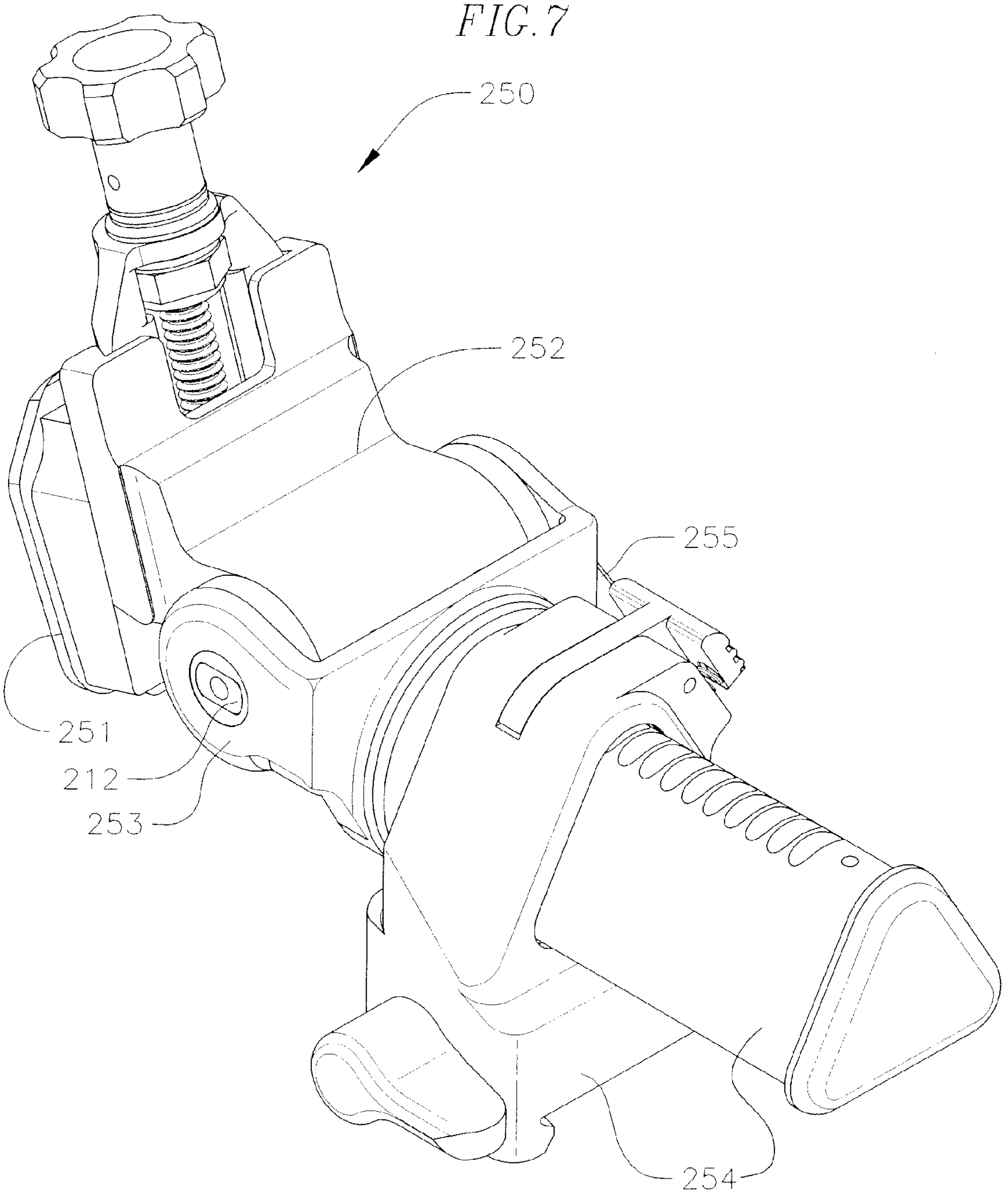
FIG. 7 is a second perspective view of a monorail helmet mount for night vision goggles with the magnetically activated switch assembly of FIG. 5 according to an exemplary embodiment of the present invention.

FIG. 6 and FIG. 7 are first and second perspective views of a monorail helmet mount 250 for night vision goggles with the magnetically activated switch assembly 200 according to an exemplary embodiment of the present invention. The monorail helmet mount 250 includes a dovetail assembly 251 that connects with a helmet block 252. A chassis 253 is connected to the helmet block 252 by the shunt shaft 212. A monorail assembly 254 is connected to the chassis 253. A pivot lever 255 is attached to the chassis 253 for allowing a user to tilt up or down the monorail assembly 254.

Figure 8:
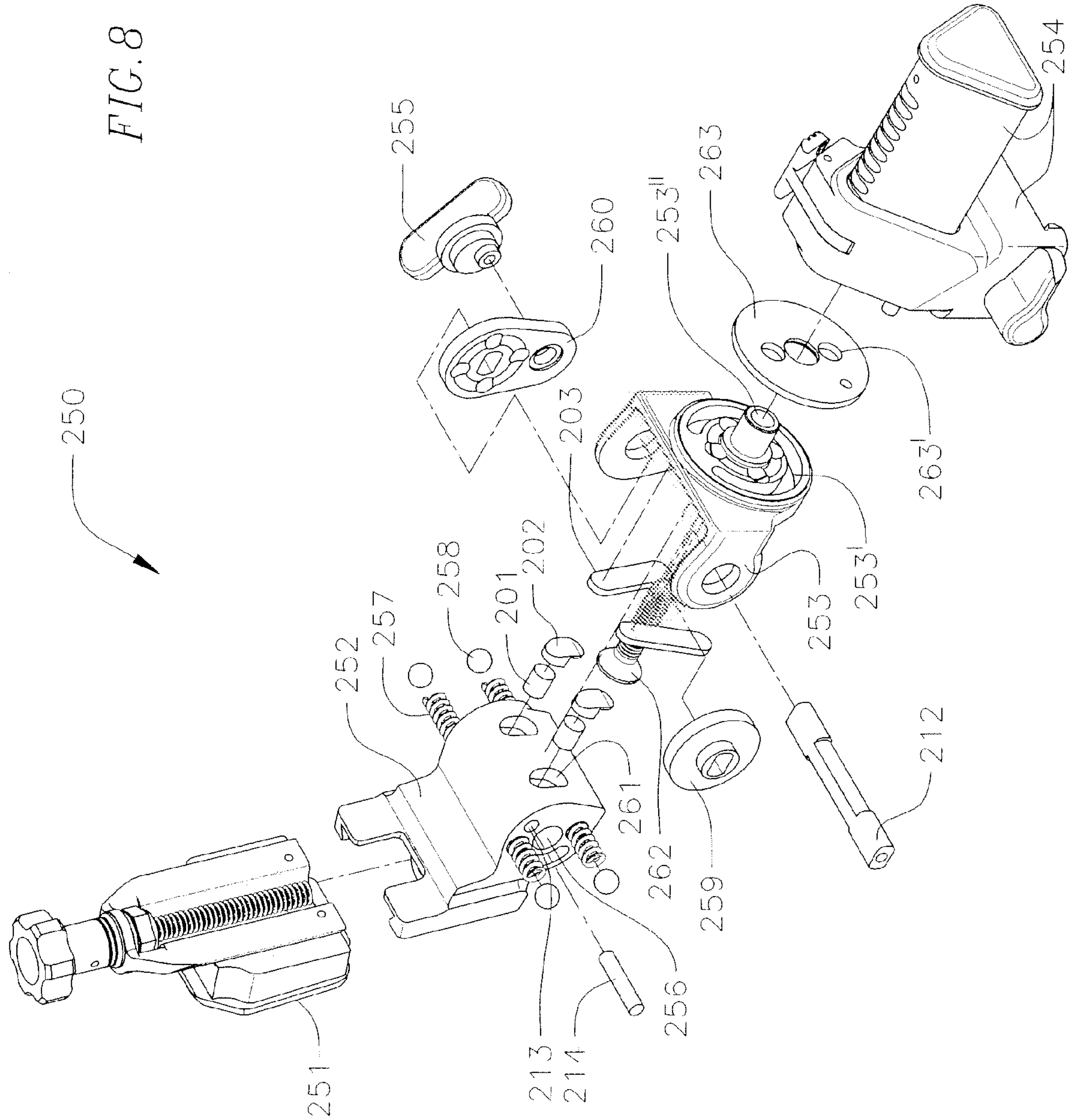
FIG. 8 is a perspective exploded view of a monorail helmet mount integrated with the magnetically activated switch assembly of FIG. 5 according to an exemplary embodiment of the present invention.

FIG. 8 is a perspective exploded view of the monorail helmet mount 250 integrated with the magnetically activated switch assembly 200. As depicted in FIG. 5, the dovetail assembly 251 connects with the helmet block 252. The helmet block 252 includes springs 257 and balls 258 adjacent the springs 257 for allowing the shunt shaft 212 to rotate within the flip-up pivot detent 259 and dovetail tilt pivot detent 260 of the chassis 253. The helmet block 252 further includes holes 261 for placement of magnets 201. The magnets 201 are positioned such that one magnet has an outer facing north pole and the other magnet has an outer facing south pole. The shunt shaft 212 is located within axis hole 256 of the helmet block 252. Magnet shoes 202 are connected to the outwardly facing north and south poles of the magnets 201. Vertical transfer conductors 203 are positioned within the rotary track 253' of the chassis 253 A bearing face 263 is positioned over the rotary track 253' on the chassis 253. A screw 262 connects the chassis 253 to the monorail assembly 254. The helmet block 252 further includes a hole 213 containing the shunt bar 214.

A shunt bar 214 installed in hole 213 aligns with the rotary conductors 207 when the first set of flux conductors 205 and second set of flux conductors 206 are in a flip-up position. This causes a further decrease in the magnetic flux conducted to the magnetic switch 204.

Figure 9:
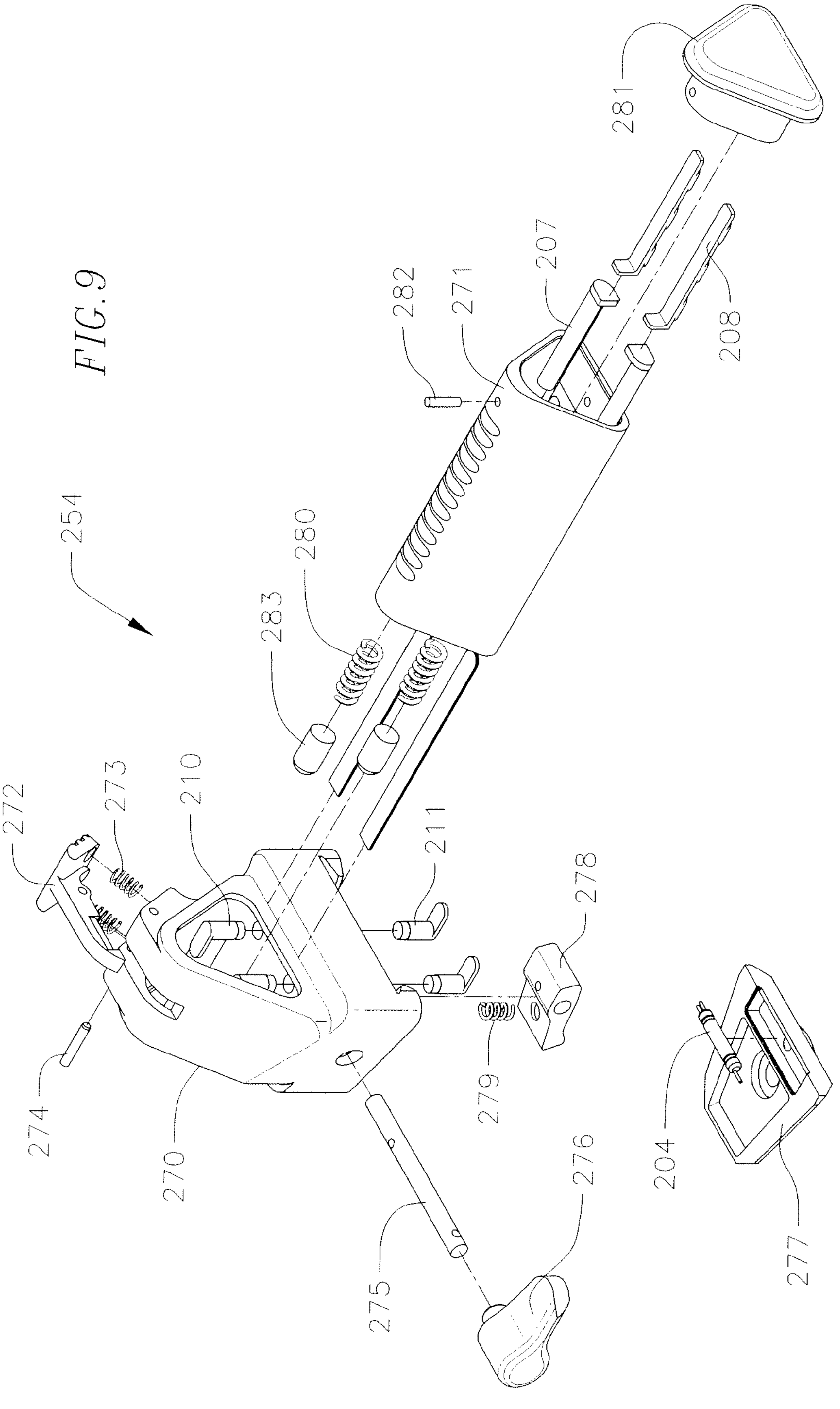
FIG. 9 is a perspective exploded view of a monorail assembly integrated with the magnetically activated switch assembly of FIG. 5 according to an exemplary embodiment of the present invention.

FIG. 9 is a perspective exploded view of a monorail assembly 254 integrated with the magnetically activated switch assembly 200. The monorail assembly 254 includes a carriage 270 connected to a monorail 271. The monorail assembly 254 includes a fore/aft lever 272 biased by springs 273 and held to the carriage 270 by a pin 274 for allowing the monorail 271 to be locked in a particular position within the carriage 270. The carriage 270 also includes a shaft 275 and a release lever 276 for allowing a night vision goggle apparatus with a goggle dovetail and reed switch assembly 277 to be connected to a bottom portion of the carriage 270. In addition, the carriage 270 includes a lock 278 and biasing spring 279 for locking a night vision goggle apparatus to the bottom of the carriage 220. The shaft 275 slides through the lock 277, holding the lock 277 in place.

Furthermore, the carriage 270 includes lower and upper transfer conductors 211, 210. The lower transfer conductors 211 are in close proximity to the reed switch 204 of the goggle dovetail assembly 277. The lower transfer conductors 211 contact or are in close proximity to the upper transfer conductors 210. The upper transfer conductors slide along a bottom surface of the monorail strip conductors 209. The monorail strip conductors 209 are T-shaped or dovetail shaped and fit within the channel of the monorail 271. Monorail conductors/vertical shoes 208 contact or are in close proximity to a top surface of the monorail strip conductors 209. Rotary conductors 207 contact or are in close proximity to the vertical shoes 208. Springs 280 fit over an edge portion of the rotary conductors 207. The springs 280 bias plungers 283 through holes 263' into detents on the face of chassis 253. Monorail end cap 281 covers an end of the monorail 271, locked in position by pin 282.

Accordingly, when the transfer pins/rotary conductors 207 are rotationally aligned with the vertical transfer conductors 203, magnetic flux from the first and second magnets 201 may propagate through the magnet shoes 202, vertical transfer conductors 203, rotary conductors 207, vertical shoes 208, monorail strip conductors 209, upper transfer conductors 210, and lower transfer conductors 211.

Accordingly, during a flip-up condition when the vertical transfer conductors 203 are un-aligned with the magnet shoes 202, the magnetic circuit experiences increased reluctance between vertical transfer conductors 203 and the magnet shoes 202 resulting in a decrease in magnetic flux conducted to the magnetic switch 204.

Furthermore during a flip-up position, a further reduction in magnetic flux conducted to the reed switch 204 may be accomplished by the addition of a shunt bar 214. The shunt bar 214 shorts the magnetic flux in the vicinity of the vertical transfer conductors 203, thus reducing the flux conducted to the magnetic switch 204.

As discussed above, reluctance of a magnetic circuit is proportional to the length of the circuit and is inversely proportion to the magnetic permeability of the materials in the circuit. Accordingly, in order to reduce reluctance of the magnetic circuit/flux path the magnet shoes 202, vertical transfer conductors 203, rotary conductors 207, vertical shoes 208, monorail strip conductors 209, upper transfer conductors 210, and lower transfer conductors 211 may be formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability for conducting magnetic flux of the magnets 201.

The total reluctance of the magnetic circuit of the magnetically activated switch assembly 200 depends on the position of the upper transfer conductors 210 along the monorail strip conductors 209. The reluctance of the magnetic circuit is minimized when the upper transfer conductors 210 are immediately below the contact point for the rotary conductors 207 and the vertical shoes 208. As the upper transfer conductors 210 slide away from the contact point in either direction, the reluctance will increase because the total length of the circuit is also increased. However, even when the upper transfer conductors 210 are positioned at ends of the monorail strip conductors 209 where reluctance of the magnetic circuit is at a maximum, the reluctance is low enough for the magnetic circuit to sufficiently conduct magnetic flux to the reed switch 204.

The magnetically activated switch assembly 200 additionally includes a shunt shaft 212 that contacts or is in close proximity with ends of the first and second magnets 201 opposite the magnet shoes 202. The shunt shaft 212 may be formed of a high magnetic permeability material. The shunt shaft 212 improves the performance of the magnetically activated switch assembly 200 by increasing the effective magnetic flux density delivered by the first and second magnets 201.

The magnetically activated switch assembly 200 is adapted to allow rotation around two different axes in order to turn the reed switch 204 on and off. The first axis is parallel to the first set of flux conductors 205 about axis 253" of the rotary track 253' (i.e., about axis 253" parallel to the rotary conductors 207, vertical shoes 208, and monorail strip conductors 209). Rotation around the first axis 253" rotates the transfer pins/rotary conductors 207 in and out of alignment with the vertical transfer conductors 203 When the transfer pins/rotary conductors 207 are rotated out of alignment with the vertical transfer conductors 203, the transfer pins/rotary conductors 207 make contact with only one of the vertical transfer conductors 203 (i.e., with the north or south pole, but not both).

The second axis is about the shunt shaft 212. Rotation around the second axis rotates the vertical transfer conductors 203 away from the magnet shoes 202, which thus increases the air gap between the vertical transfer conductors 203 and magnet shoes 202, increasing the total reluctance of the magnetic circuit. The magnet shoes 202 are formed with a curved upper portion such that the vertical transfer conductors 203 continue to be in close proximity with the magnet shoes 202 for a predetermined tilt range. That is, the magnet shoes 202 are configured to maintain close proximity to the vertical transfer conductors 203 while the chassis 258 is tilted by pivot lever 255. According to an exemplary embodiment of the present invention, the tilt range may be 5 degrees below a centerline position and 13 degrees above the centerline position.

When night vision goggles connected to the carriage 270 are put into a flip-up or stow position, the vertical transfer conductors 203 are moved sufficiently away from the magnet shoes 202 such that magnetic flux is broken between the magnet shoes 202 and the vertical transfer conductors 203, which turns the night vision goggles off. If an improved ratio of on/off magnetic flux is desired, then the shunt bar 214 may be added. This will short the magnetic flux during a flip-up operation.

Because the magnetically activated switch assembly 200 includes magnets located farther from the reed switch 204 than the magnetically activated switch assembly 100, the reluctance of the magnetic circuit/flux path of the magnetically activated switch assembly 200 is higher than the magnetic circuit/flux path of the magnetically activated switch assembly 100. Accordingly, in the magnetically activated switch assembly 200, air gaps should be minimized, especially air gaps located away from the magnet or magnets. Therefore, according to an exemplary embodiment of the present invention, when using AISI 12L14 carbon steel for magnetic circuit components, air gaps in the magnetically activated switch assembly 200 should be less than 0.005 inches at any one point. Of course, air gaps may be larger than 0.005 inches when a more powerful magnet or magnets are used or the first and second sets of flux conductors are formed of a higher magnetic permeability material.

Figure 10:
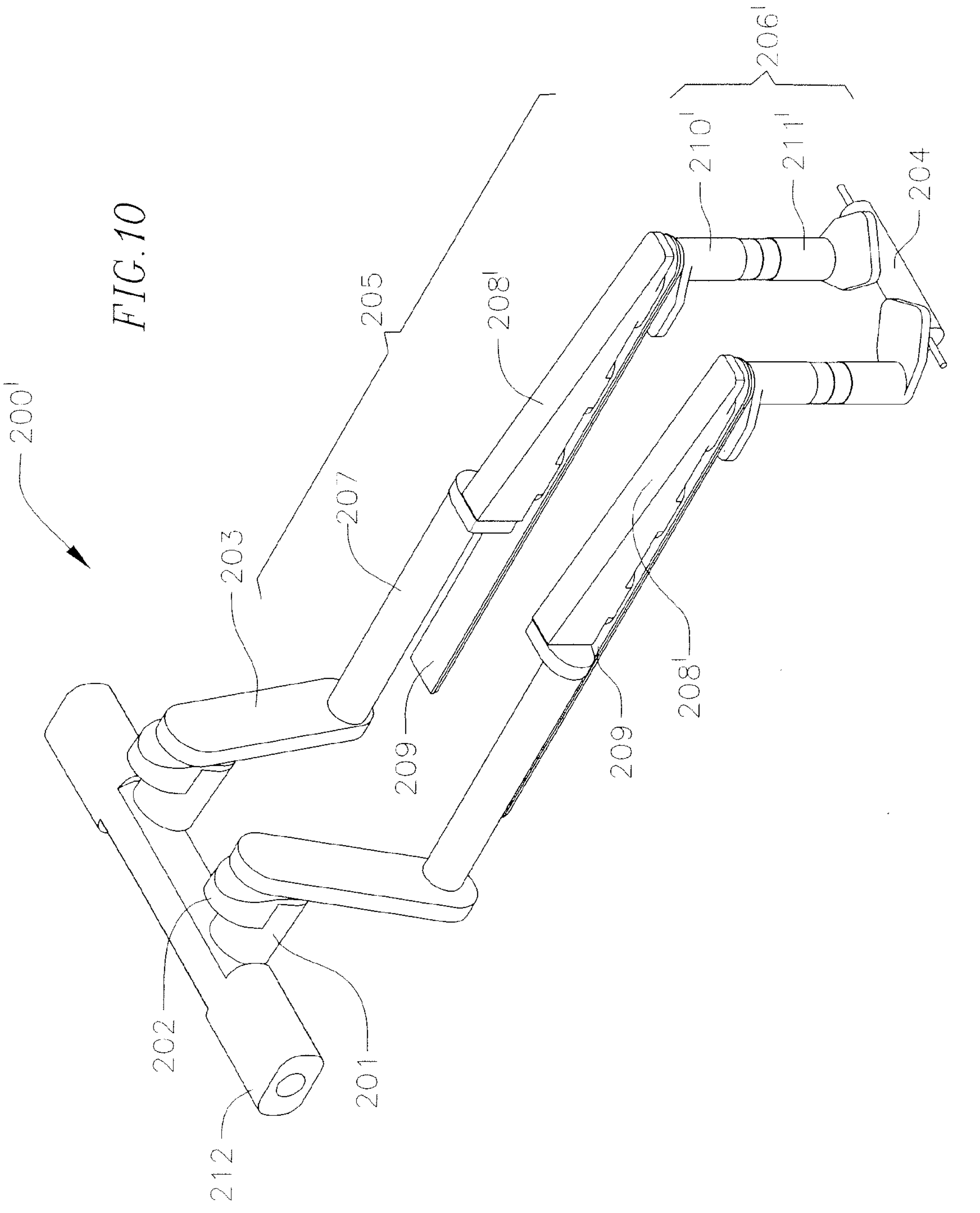
FIG. 10 is a perspective view of a magnetically activated switch assembly according to yet another exemplary embodiment of the present invention.

FIG. 10 is a perspective view of a magnetically activated switch assembly according to yet another exemplary embodiment of the present invention. As depicted in FIG. 10, the upper and lower transfer conductors 210', 211' may be formed with larger feet to better conduct magnetic flux from the monorail strip conductors 209 through the transfer conductors 206' to the reed switch 204.

Figures 11, 12:
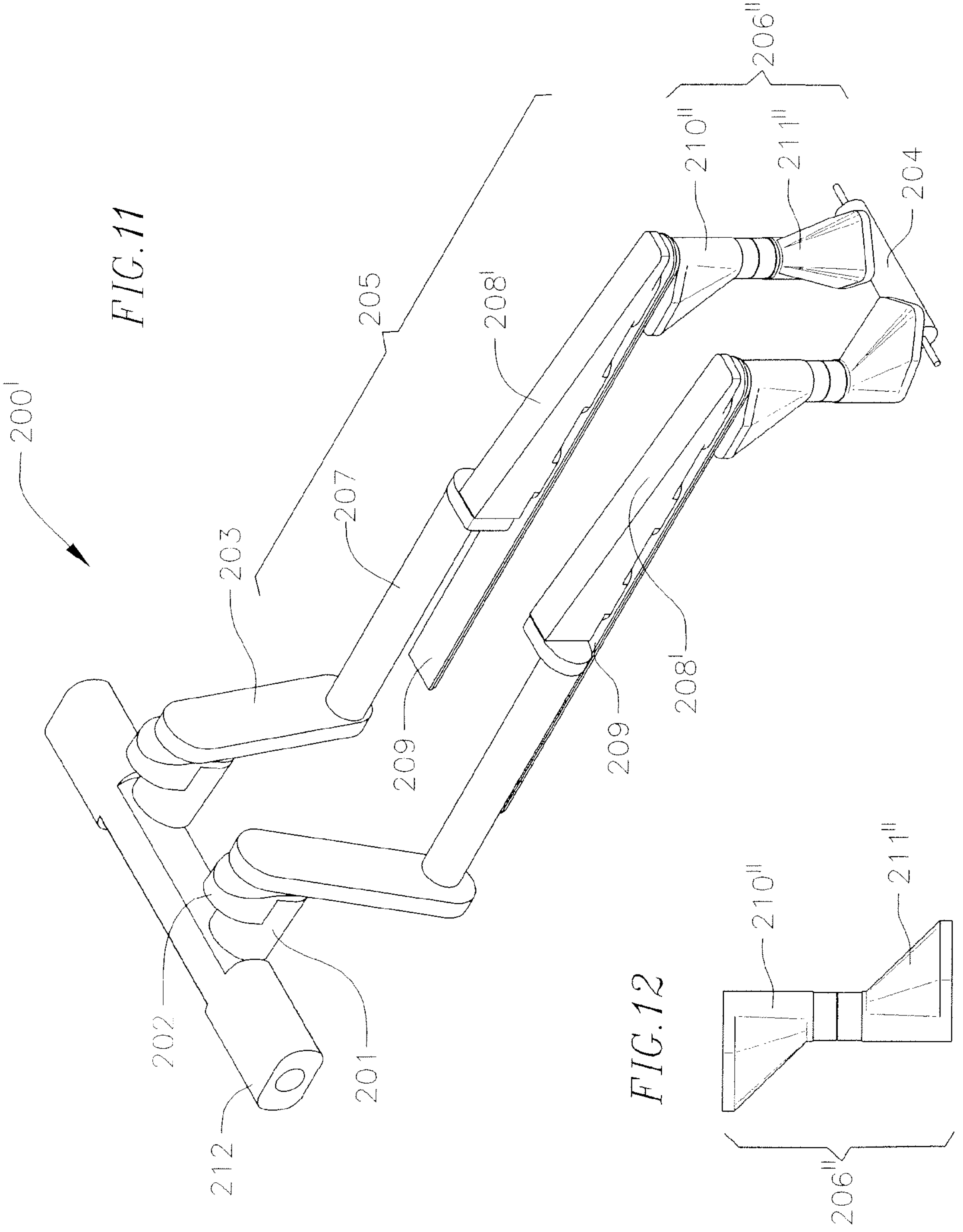
FIG. 11 and FIG. 12 are perspective views of a magnetically activated switch assembly according to yet another exemplary embodiment of the present invention.

FIG. 11 and FIG. 12 are perspective views of a magnetically activated switch assembly according to yet another exemplary embodiment of the present invention. As depicted in FIGS. 11 and 12, the upper and lower transfer conductors 210", 211" may be formed with tapered portions extending from a tip of the feet to an end of each respective transfer conductor. The tapering increases the cross-sectional area of the transfer conductors 206", which decreases the reluctance of the transfer conductors 206" and therefore better conducts magnetic flux to the reed switch 204.

As discussed above, the reluctance of a magnetic circuit is proportional to the length of the circuit and is inversely proportional to the magnetic permeability of the material used in the circuit and the cross-sectional area of the circuit. As such, various modifications to the exemplary embodiments of the magnetic circuits may be made in order to decrease the length of the circuit, increase the magnetic permeability of the circuit, or increase the cross-sectional area of the circuit. Furthermore, because weight of the magnetic circuit is also an important consideration, various modifications to the exemplary embodiments of the magnetic circuits may be made in order to both reduce the weight and reduce the reluctance of the magnetic circuit. For example, a heavier material of a higher magnetic permeability may be used for the magnetic circuit, while decreasing a cross-sectional area of the circuit, such that a total weight of the magnetic circuit is reduced while still achieving an overall lower reluctance of the magnetic circuit.

Figure 13:
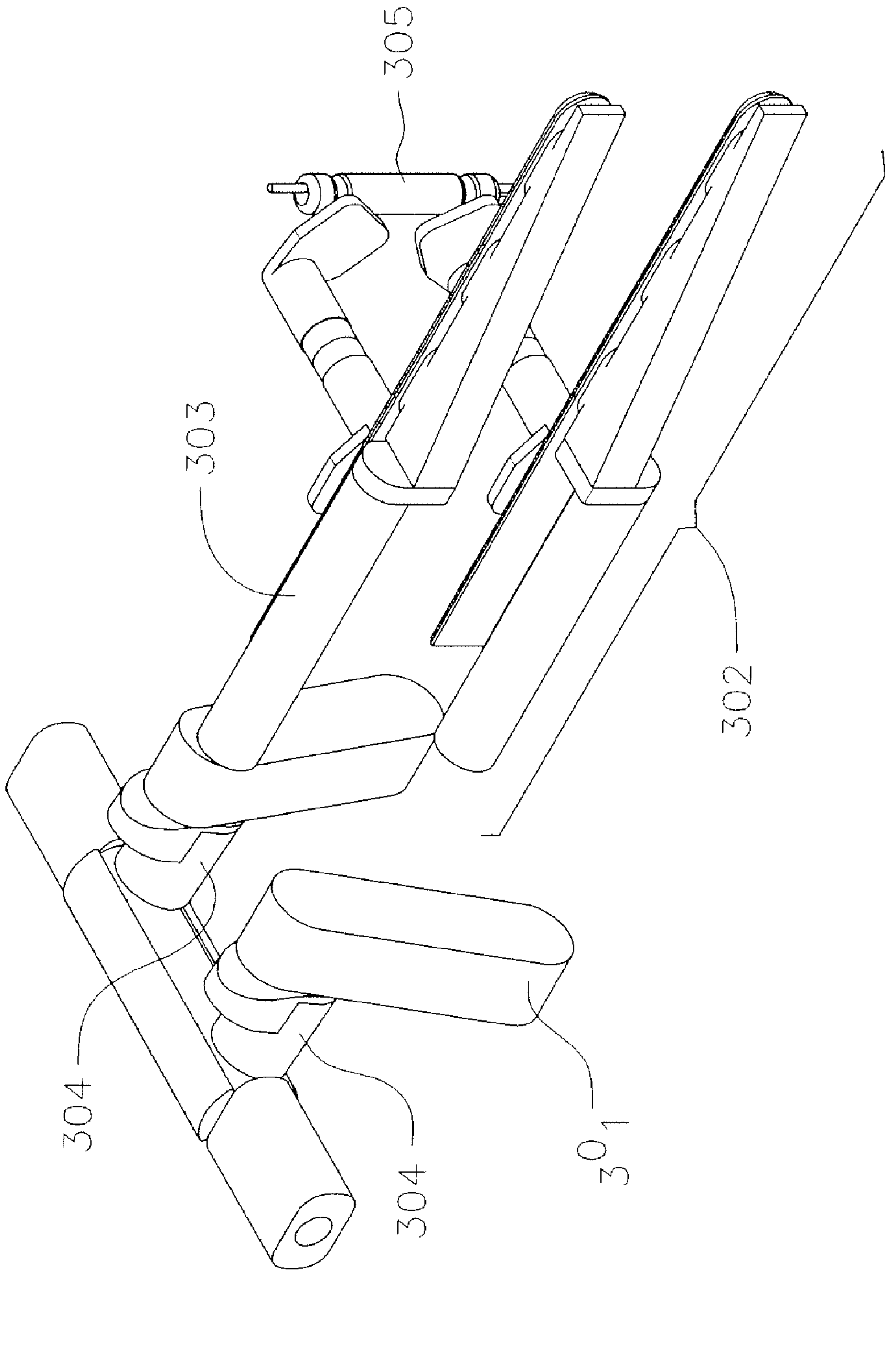
FIG. 13 is a perspective view of a magnetically activated switch assembly rotated 90° according to an exemplary embodiment of the present invention.

FIG. 13 is a perspective view of a magnetically activated switch assembly rotated 90° according to an exemplary embodiment of the present invention. As the first and second set of transfer conductors 302 and the reed switch 305 are rotated 90°, the transfer pins/rotary conductors 303 rotate away from the vertical transfer conductors 301. When the transfer pins/rotary conductors 303 are rotated away from the vertical transfer conductors 301, magnetic flux from the first and second magnets 304 do not propagate to the reed switch 305.

Figure 14:
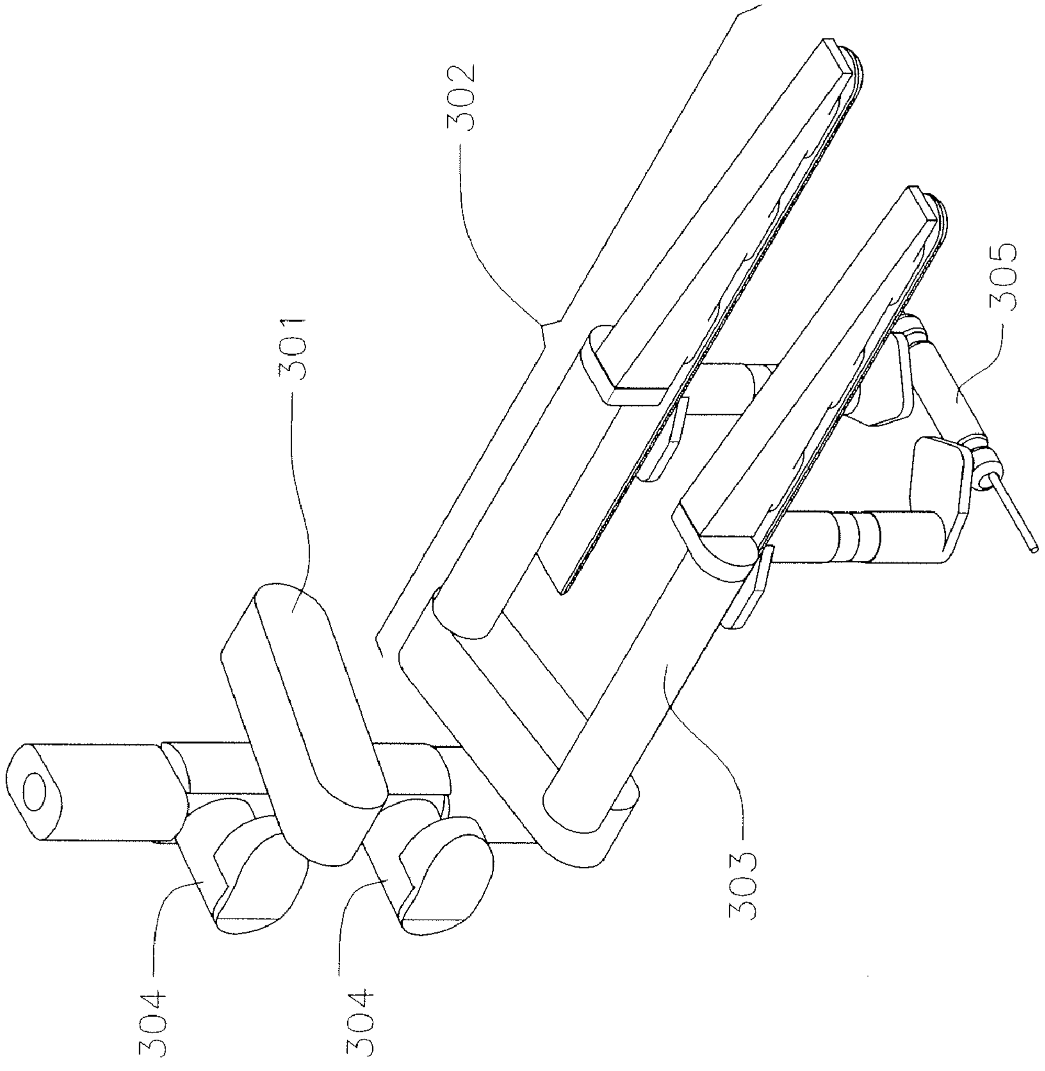
FIG. 14 is a perspective view of a magnetically activated switch assembly rotated 90° and in a flip-up position according to an exemplary embodiment of the present invention.

FIG. 14 is a perspective view of a magnetically activated switch assembly rotated 90° and in a flip-up position according to an exemplary embodiment of the present invention. As the first and second set of transfer conductors 302, reed switch 305, and vertical transfer conductors 301 are put into a flip-up position, the vertical transfer conductors 301 rotate away from the first and second magnets 304. When the vertical transfer conductors 301 are rotated away from the first and second magnets 304, magnetic flux from the first and second magnets 304 do not propagate to the reed switch 305.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A magnetically activated switch assembly comprising:

a magnet having a first magnet end and a second magnet end; and a first magnetic circuit including a magnetically activated switch, a first set of flux conductors, and a second set of flux conductors, the first set of flux conductors having first flux conductor flanges adapted to conduct flux from the first magnet end and the second magnet end, the second set of flux conductors being slidingly positioned relative to the first set of flux conductors and being adapted to conduct flux from the first set of flux conductors to the magnetically activated switch;

wherein the first set of flux conductors are adapted to rotate clockwise or counter-clockwise and the first magnetic circuit is adapted to conduct flux to activate the magnetically activated switch only when the first flux conductor flanges are rotationally aligned with the first magnet end and the second magnet end.

2. The magnetically activated switch assembly as claimed in claim 1, wherein the magnetically activated switch assembly is adapted to tilt between a lower tilt position and an upper tilt position;

the magnet is adapted to remain radially adjacent the first flux conductor flanges as the magnetically activated switch assembly is tilted between the lower tilt position and the upper tilt position;

the magnet is adapted to move closer to the first flux conductor flanges as the magnetically activated switch assembly is rotated to a flip-down position; and the magnet is adapted to move farther from the first flux conductor flanges as the magnetically activated switch assembly is rotated to a flip-up or stow position.

3. The magnetically activated switch as claimed in claim 2, wherein the lower tilt position is 5 degrees below a centerline tilt position and the upper tilt position is 13 degrees above the centerline tilt position.

4. The magnetically activated switch as claimed in claim 2, wherein the first flux conductor flanges are located in a center of the first set of flux conductors such that a maximum reluctance of the first magnetic circuit is minimized as the second set of flux conductors are slidingly positioned between ends of the first set of flux conductors.

5. The magnetically activated switch assembly as claimed in claim 2, further comprising:

a shunt ring positioned proximate the magnet such that as the magnetically activated switch assembly rotates to a flip-up or stow position, the magnet moves along an axis of the shunt ring to a position inside the shunt ring, and as the magnetically activated switch assembly rotates to a flip-down position, the magnet moves along the axis of the shunt ring to a position outside the shunt ring radially adjacent the first flux conductor flanges.

6. The magnetically activated switch assembly as claimed in claim 5, wherein the shunt ring is a second magnetic circuit having a high magnetic permeability.

7. The magnetically activated switch assembly as claimed in claim 5, further comprising:

a magnet carrier housing the magnet; and an actuator shaft attached to the magnet carrier;

wherein as the magnetically activated switch assembly rotates to a flip-up position, the actuator shaft and magnet carrier move along the axis of the shunt ring such that the magnet carrier is positioned inside the shunt ring, and as the magnetically activated switch assembly rotates to a flip-down position, the actuator shaft and magnet carrier move along the axis of the shunt ring such that the magnet carrier is positioned outside the shunt ring radially adjacent the first flux conductor flanges.

8. The magnetically activated switch assembly as claimed in claim 7, wherein the magnet carrier is made out of a low magnetic permeability metal or plastic such as nylon, polyimide thermoplastic resin, or other low magnetic permeability material.

9. The magnetically activated switch assembly as claimed in claim 7, further comprising:

a helmet block having a cam shaped channel;

a coil spring coupled to the magnet carrier and to an end of the magnetically activated switch assembly;

wherein the actuator shaft has a flat edge at an end for fitting into the channel and the coil spring biases the magnet carrier toward the helmet block.

10. The magnetically activated switch assembly as claimed in claim 1, wherein the second set of flux conductors include upper transfer conductors and lower transfer conductors; the upper transfer conductors contacting or being in close proximity with the lower transfer conductors, and the lower transfer conductors being in close proximity to the magnetically activated switch; and the first set of flux conductors include vertical shoes and monorail strip conductors, the first flux conductor flanges extending from a center of the vertical shoes, the vertical shoes being in contact or in close proximity to a top of the monorail strip conductors, the monorail strip conductors being T-shaped or dovetail shaped, the upper transfer conductors being adapted to slide along bottom portions of the monorail strip conductors.

11. The magnetically activated switch assembly as claimed in claim 1, wherein the first set of flux conductors and the second set of flux conductors are formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

12. The magnetically activated switch assembly as claimed in claim 1, wherein the magnetically activated switch assembly is integrated into a helmet mount for night vision goggles such that the magnetically activated switch assembly turns on the night vision goggles only when the night vision goggles are in a flip-down position and the first flux conductor flanges are rotationally aligned with poles of the magnet.

13. The magnetically activated switch assembly as claimed in claim 1, wherein the magnetically activated switch is a reed switch.

14. A magnetically activated switch assembly comprising:

a first magnet having a first magnet north end and a first magnet south end;

a second magnet having a second magnet north end and a second magnet south end; and a magnetic circuit including a magnetically activated switch, a first set of flux conductors, and a second set of flux conductors, the first set of flux conductors being adapted to conduct flux from the first magnet north end and the second magnet south end to the second set of flux conductors, the second set of flux conductors being slidingly positioned relative to the first set of flux conductors and being adapted to conduct flux from the first set of flux conductors to the magnetically activated switch;

wherein the magnetic circuit is adapted to rotate clockwise or counter-clockwise and to activate the magnetically activated switch only when the first set of flux conductors are rotationally aligned with the first magnet north end and the second magnet south end.

15. The magnetically activated switch assembly as claimed in claim 14, further comprising a shunt shaft, wherein the first magnet south end and the second magnet north end contact or are in close proximity with the shunt shaft.

16. The magnetically activated switch assembly as claimed in claim 15, wherein the shunt shaft has a high magnetic permeability.

17. The magnetically activated switch assembly as claimed in claim 14, wherein the magnetically activated switch is a reed switch.

18. The magnetically activated switch assembly as claimed in claim 14, wherein the first set of flux conductors and the second set of flux conductors are formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

19. The magnetically activated switch assembly as claimed in claim 14, wherein the magnetic circuit is adapted to tilt between a lower tilt position and an upper tilt position, and the magnetic circuit is adapted to activate the magnetically activated switch only when the magnetic circuit is in a flip-down position and the first set of flux conductors are rotationally aligned with the first magnet north end and the second magnet south end.

20. The magnetically activated switch assembly as claimed in claim 19, further comprising:

a shunt bar, wherein the shunt bar is positioned such that when the magnetic circuit is in a flip-up position, the shunt bar shorts the magnetic circuit resulting in a further decrease in magnetic flux conducted to the magnetically activated switch.

21. The magnetically activated switch assembly as claimed in claim 19, further comprising:

a first magnet shoe connected to the first magnet north end, a second magnet shoe connected to the second magnet south end, a first vertical transfer conductor contacting or in close proximity with the first magnet shoe, and a second vertical transfer conductor contacting or in close proximity with the second magnet shoe, wherein the first set of flux conductors are adapted to be in close proximity with the first vertical transfer conductor and the second vertical transfer conductor only when the first set of flux conductors are rotationally aligned with the first vertical transfer conductor and the second vertical transfer conductor, and the magnetic circuit is between the lower tilt position and the upper tilt position, and wherein the first magnet shoe and the second magnet shoe are configured to obtain the lower tilt position and the upper tilt position.

22. The magnetically activated switch assembly as claimed in claim 21, wherein the second set of flux conductors include upper transfer conductors and lower transfer conductors, the lower transfer conductors being in close proximity to the magnetically activated switch, the upper transfer conductors being in contact or in close proximity with the lower transfer conductors; and the first set of flux conductors include monorail strip conductors, vertical shoes, and rotary conductors, the monorail strip conductors being in contact or in close proximity with the upper transfer conductors and being T-shaped or dovetail shaped, the upper transfer conductors being adapted to slide along bottom portions of the monorail strip conductors in the second direction, the vertical shoes being in contact or in close proximity to a top portion of the monorail strip conductors;

the rotary conductors being in contact or in close proximity to the vertical shoes and being in close proximity to the first vertical transfer conductor and the second vertical transfer conductor only when the rotary conductors are rotationally aligned with the first vertical transfer conductor and the second vertical transfer conductor and the magnetic circuit is in a flip-down position.

23. The magnetically activated switch assembly as claimed in claim 19, wherein the magnetically activated switch assembly is integrated into a helmet mount for night vision goggles such that the magnetically activated switch assembly turns on the night vision goggles only when the night vision goggles are in a flip-down position and the rotary conductors are rotationally aligned with the first vertical transfer conductor and the second vertical transfer conductor.

24. A helmet mount assembly having a magnetically activated switch assembly comprising:

a helmet block having a cam shaped channel and an axis hole parallel to a first direction;

a chassis mounted to the helmet block by a shaft inserted through the axis hole, the chassis having a rotating member that rotates about an axis parallel to a second direction, the second direction being perpendicular to the first direction; and a monorail assembly connected to the chassis, the monorail assembly including the magnetically activated switch assembly;

wherein the magnetically activated switch assembly includes:

a magnet having a first magnet end and a second magnet end; and a first magnetic circuit including a magnetically activated switch, a first set of flux conductors, and a second set of flux conductors, the first set of flux conductors having first flux conductor flanges adapted to conduct flux from the first magnet end and the second magnet end, the second set of flux conductors being slidingly positioned relative to the first set of flux conductors and being adapted to conduct flux from the first set of flux conductors to the magnetically activated switch;

wherein the first set of flux conductors are coupled to the rotating member and adapted to rotate clockwise or counter-clockwise about the axis parallel to the second direction and the first magnetic circuit is adapted to conduct flux to activate the magnetically activated switch only when the first flux conductor flanges are rotationally aligned with the first magnet end and the second magnet end.

25. The helmet mount assembly as claimed in claim 24, wherein the magnetically activated switch assembly is adapted to tilt between a lower tilt position and an upper tilt position with respect to the shaft;

the magnet is adapted to remain radially adjacent the first flux conductor flanges as the magnetically activated switch assembly is tilted between the upper tilt position to the lower tilt position;

the magnet is adapted to move closer to the first flux conductor flanges in the second direction away from the helmet block as the magnetically activated switch assembly rotates to a flip-down position;

the magnet is adapted to move farther from the first flux conductor flanges in the second direction towards the helmet block as the magnetically activated switch assembly rotates to a flip-up or stow position.

26. The helmet mount assembly as claimed in claim 25, wherein the lower tilt position is 5 degrees below a centerline tilt position and the upper tilt position is 13 degrees above the centerline tilt position.

27. The helmet mount assembly as claimed in claim 25, wherein the first flux conductor flanges are located in a center of the first set of flux conductors such that a maximum reluctance of the first magnetic circuit is minimized as the second set of flux conductors are slidingly positioned in the second direction between ends of the first set of flux conductors.

28. The helmet mount assembly as claimed in claim 25, further comprising:

a shunt ring positioned proximate the magnet such that as the magnetically activated switch assembly rotates to a flip-up or stow position, the magnet moves in the second direction towards the helmet block to a position inside the shunt ring, and as the magnetically activated switch assembly rotates to a flip-down position, the magnet moves in the second direction away from the helmet block to a position outside the shunt ring radially adjacent the first flux conductor flanges.

29. The helmet mount assembly as claimed in claim 28, wherein the shunt ring is a second magnetic circuit having a high magnetic permeability.

30. The helmet mount assembly as claimed in claim 28, further comprising:

a magnet carrier housing the magnet; and an actuator shaft attached to the magnet carrier, the actuator shaft extending in the second direction;

wherein as the magnetically activated switch assembly rotates to a flip-up or stow position, the actuator shaft and magnet carrier move in the second direction towards the helmet block such that the magnet carrier is positioned inside the shunt ring, and as the magnetically activated switch assembly rotates to a flip-down position, the actuator shaft and magnet carrier move in the second direction away from the helmet block such that the magnet carrier is positioned outside the shunt ring radially adjacent the first flux conductor flanges.

31. The helmet mount assembly as claimed in claim 30, wherein the magnet carrier is made out of a low magnetic permeability metal or plastic, such as nylon, a polyimide thermoplastic resin, or other low magnetic permeability material.

32. The helmet mount assembly as claimed in claim 30, further comprising:

a coil spring coupled to the magnet carrier and to an end of the magnetically activated switch assembly;

wherein the actuator shaft has a flat edge at an end for fitting into the channel and the coil spring biases the magnet carrier toward the helmet block.

33. The helmet mount assembly as claimed in claim 24, wherein the second set of flux conductors include upper transfer conductors and lower transfer conductors; the upper transfer conductors being in contact or in close proximity with the lower transfer conductors, and the lower transfer conductors being in close proximity to the magnetically activated switch; and the first set of flux conductors include vertical shoes and monorail strip conductors, the first flux conductor flanges extending from a center of the vertical shoes, the vertical shoes being in contact or in close proximity to a top of the monorail strip conductors, the monorail strip conductors being T-shaped or dovetail shaped, the upper transfer conductors being adapted to slide along bottom portions of the monorail strip conductors.

34. The helmet mount assembly as claimed in claim 24, wherein the first set of flux conductors and the second set of flux conductors are formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

35. The helmet mount assembly as claimed in claim 24, wherein the helmet mount assembly is integrated with night vision goggles such that the magnetically activated switch assembly turns on the night vision goggles only when the night vision goggles are in a flip-down position and the first flux conductor flanges are rotationally aligned with poles of the magnet.

36. The helmet mount assembly as claimed in claim 24, wherein the magnetically activated switch is a reed switch.

37. A helmet mount assembly having a magnetically activated switch assembly comprising:

a helmet block having a cam shaped channel and an axis hole parallel to a first direction;

a chassis mounted to the helmet block by a shaft inserted through the axis hole, the chassis having a rotating member that rotates about an axis parallel to a second direction, the second direction being perpendicular to the first direction; and a monorail assembly connected to the chassis, the monorail assembly including the magnetically activated switch assembly;

wherein the magnetically activated switch assembly includes:

a first magnet having a first magnet north end and a first magnet south end;

a second magnet having a second magnet north end and a second magnet south end; and a magnetic circuit including a magnetically activated switch, a first set of flux conductors, and a second set of flux conductors, the first set of flux conductors being adapted to conduct flux from the first magnet north end and the second magnet south end to the second set of flux conductors, the second set of flux conductors being slidingly positioned relative to the first set of flux conductors and being adapted to conduct flux from the first set of flux conductors to the magnetically activated switch;

wherein the magnetic circuit is coupled to the rotating member and adapted to rotate clockwise or counterclockwise about the axis parallel to the second direction and to activate the magnetically activated switch only when the first set of flux conductors are rotationally aligned with the first magnet north end and the second magnet south end.

38. The helmet mount assembly as claimed in claim 37, wherein the first magnet south end and the second magnet north end contact or are in close proximity with the shaft.

39. The helmet mount assembly as claimed in claim 38, wherein the shaft has a high magnetic permeability.

40. The helmet mount assembly as claimed in claim 37, wherein the magnetically activated switch is a reed switch.

41. The helmet mount assembly as claimed in claim 37, wherein the first set of flux conductors and the second set of flux conductors are formed of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

42. The helmet mount assembly as claimed in claim 37, wherein the magnetic circuit is adapted to tilt between a lower tilt position and an upper tilt position with respect to the shaft, and to activate the magnetically activated switch only when the magnetic circuit is in a flip-down position and the first set of flux conductors are rotationally aligned with the first magnet north end and the second magnet south end.

43. The helmet mount assembly as claimed in claim 42, further comprising:

a first magnet shoe connected to the first magnet north end, a second magnet shoe connected to the second magnet south end, a first vertical transfer conductor contacting or in close proximity with the first magnet shoe, and a second vertical transfer conductor contacting or in close proximity with the second magnet shoe, wherein the first set of flux conductors are adapted to be in close proximity with the first vertical transfer conductor and the second vertical transfer conductor only when the first set of flux conductors are rotationally aligned with the first vertical transfer conductor and the second vertical transfer conductor and the magnetic circuit is in a flip-down position, and wherein the first magnet shoe and the second magnet shoe are configured to obtain the upper tilt position and the lower tilt position.

44. The helmet mount assembly as claimed in claim 43, further comprising:

a shunt bar, wherein the shunt bar is positioned such that when the magnetic circuit is in a flip-up position, the shunt bar shorts the magnetic circuit resulting in a further decrease in magnetic flux conducted to the magnetically activated switch.

45. The helmet mount assembly as claimed in claim 43, wherein the second set of flux conductors include upper transfer conductors and lower transfer conductors, the lower transfer conductors being in close proximity to the magnetically activated switch, the upper transfer conductors being in contact or in close proximity with the lower transfer conductors; and the first set of flux conductors include monorail strip conductors, vertical shoes, and rotary conductors, the monorail strip conductors being in contact or in close proximity with the upper transfer conductors and being T-shaped or dovetail shaped, the upper transfer conductors being adapted to slide along bottom portions of the monorail strip conductors in the second direction, the vertical shoes being in contact or in close proximity to a top portion of the monorail strip conductors;

the rotary conductors being in contact or in close proximity to the vertical shoes and being in close proximity to the first vertical transfer conductor and the second vertical transfer conductor only when the rotary conductors are rotationally aligned with the first vertical transfer conductor and the second vertical transfer conductor and the magnetic circuit is in a flip-down position.

46. The helmet mount assembly as claimed in claim 42, wherein the helmet mount assembly is integrated with night vision goggles such that the magnetically activated switch assembly turns on the night vision goggles only when the night vision goggles are in a flip-down position and the rotary conductors are rotationally aligned with the first vertical transfer conductor and the second vertical transfer conductor.

47. A method of forming a magnetically activated switch assembly in a helmet mount for turning on and turning off night vision goggles attached to the helmet mount, the method comprising:

forming the magnetically activated switch assembly with a magnet and a first magnetic circuit, the magnet having magnet poles;

forming the first magnetic circuit with a magnetically activated switch, a first set of flux conductors, and a second set of flux conductors;

forming the first set of flux conductors with first flux conductor flanges for conducting flux from the magnet poles;

positioning the second set of flux conductors to slide relative to the first set of flux conductors and to conduct flux from the first set of flux conductors to the magnetically activated switch;

arranging the first set of flux conductors to rotate clockwise or counter-clockwise and the first magnetic circuit to conduct flux to activate the magnetically activated switch only when the first flux conductor flanges are rotationally aligned with the magnet poles.

48. The method as claimed in claim 47, the method further comprising:

arranging the magnetically activated switch assembly to tilt between a lower tilt position and an upper tilt position;

maintaining the magnet radially adjacent the first flux conductor flanges as the magnetically activated switch assembly is tilted between the lower tilt position and the upper tilt position;

positioning the magnet closer to the first flux conductor flanges as the magnetically activated switch assembly is rotated to a flip-down position; and positioning the magnet farther from the first flux conductor flanges as the magnetically activated switch assembly is rotated to a flip-up or stow position.

49. The method as claimed in claim 48, the method further comprising:

setting the lower tilt position 5 degrees below a centerline tilt position and the upper tilt position 13 degrees above the centerline tilt position.

50. The method as claimed in claim 48, the method further comprising:

locating the first flux conductor flanges in a center of the first set of flux conductors such that a maximum reluctance of the first magnetic circuit is minimized as the second set of flux conductors are slidingly positioned between ends of the first set of flux conductors.

51. The method as claimed in claim 48, the method further comprising:

locating a shunt ring proximate the magnet such that as the magnetically activated switch assembly rotates to a flip-up or stow position, the magnet moves along an axis of the shunt ring to a position inside the shunt ring, and as the magnetically activated switch assembly rotates to a flip-down position, the magnet moves along the axis of the shunt ring to a position outside the shunt ring radially adjacent the first flux conductor flanges.

52. The method as claimed in claim 51, wherein the shunt ring is a second magnetic circuit having a high magnetic permeability.

53. The method as claimed in claim 51, the method further comprising:

locating a magnet carrier to house the magnet; and attaching an actuator shaft to the magnet carrier;

wherein as the magnetically activated switch assembly rotates to a flip-up position, the actuator shaft and magnet carrier move along the axis of the shunt ring such that the magnet carrier is positioned inside the shunt ring, and as the magnetically activated switch assembly rotates to a flip-down position, the actuator shaft and magnet carrier move along the axis of the shunt ring such that the magnet carrier is positioned outside the shunt ring radially adjacent the first flux conductor flanges.

54. The method as claimed in claim 53, the method further comprising:

forming the magnet carrier out of a low magnetic permeability metal or plastic, such as nylon, a polyimide thermoplastic resin, or other low magnetic permeability material.

55. The method as claimed in claim 53, the method further comprising:

locating a helmet block in the helmet mount having a cam shaped channel;

coupling a coil spring to the magnet carrier and to an end of the magnetically activated switch assembly;

wherein the actuator shaft has a flat edge at an end for fitting into the channel and the coil spring biases the magnet carrier toward the helmet block.

56. The method as claimed in claim 47, wherein the second set of flux conductors include upper transfer conductors and lower transfer conductors; the upper transfer conductors contacting or being in close proximity with the lower transfer conductors, and the lower transfer conductors being in close proximity to the magnetically activated switch; and the first set of flux conductors include vertical shoes and monorail strip conductors, the first flux conductor flanges extending from a center of the vertical shoes, the vertical shoes being in contact or in close proximity to a top of the monorail strip conductors, the monorail strip conductors being T-shaped or dovetail shaped, the upper transfer conductors being adapted to slide along bottom portions of the monorail strip conductors.

57. The method as claimed in claim 47, the method further comprising:

forming the first set of flux conductors and the second set of flux conductors of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

58. The method as claimed in claim 47, the method further comprising:

turning on the night vision goggles with the magnetically activated switch assembly only when the night vision goggles are in a flip-down position and the first flux conductor flanges are rotationally aligned with poles of the magnet.

59. The method as claimed in claim 47, wherein the magnetically activated switch is a reed switch.

60. A method of forming a magnetically activated switch assembly in a helmet mount for turning on and turning off night vision goggles attached to the helmet mount, the method comprising:

forming the magnetically activated switch assembly with a first magnet having a first magnet north end and a first magnet south end, a second magnet having a second magnet north end and a second magnet south end, and a magnetic circuit including a magnetically activated switch, a first set of flux conductors, and a second set of flux conductors;

adapting the first set of flux conductors to conduct flux from the first magnet north end and the second magnet south end to the second set of flux conductors;

positioning the second set of flux conductors to slide relative to the first set of flux conductors and to conduct flux from the first set of flux conductors to the magnetically activated switch;

arranging the magnetic circuit to rotate clockwise or counter-clockwise and to activate the magnetically activated switch only when the first set of flux conductors are rotationally aligned with the first magnet north end and the second magnet south end.

61. The method as claimed in claim 60, the method further comprising:

locating a shunt shaft such that the first magnet south end and the second magnet north end contact or are in close proximity with the shunt shaft.

62. The method as claimed in claim 61, the method further comprising:

forming the shunt shaft with a high magnetic permeability.

63. The method as claimed in claim 60, wherein the magnetically activated switch is a reed switch.

64. The method as claimed in claim 60, the method further comprising:

forming the first set of flux conductors and the second set of flux conductors of Mu-metal, Permalloy, iron-nickel alloy, iron-cobalt alloy, ferritic iron-chrome alloy, iron, ferrite, silicon steel, soft steel, AISI 12L14 carbon steel, nickel, or any other material with a high magnetic permeability.

65. The method as claimed in claim 60, the method further comprising:

arranging the magnetic circuit to tilt between a lower tilt position and an upper tilt position, and allowing the magnetic circuit to activate the magnetically activated switch only when the magnetic circuit is in a flip-down position and the first set of flux conductors are rotationally aligned with the first magnet north end and the second magnet south end.

66. The method as claimed in claim 65, the method further comprising:

connecting a first magnet shoe to the first magnet north end, connecting a second magnet shoe to the second magnet south end, positioning a first vertical transfer conductor to contact or be in close proximity with the first magnet shoe, and positing a second vertical transfer conductor to contact or be in close proximity with the second magnet shoe, positioning the first set of flux conductors to be in close proximity with the first vertical transfer conductor and the second vertical transfer conductor only when the first set of flux conductors are rotationally aligned with the first vertical transfer conductor and the second vertical transfer conductor, and the magnetic circuit is between the lower tilt position and the upper tilt position, and forming the first magnet shoe and the second magnet shoe to obtain the lower tilt position and the upper tilt position.

67. The method as claimed in claim 66, the method further comprising:

positioning a shunt bar such that when the magnetic circuit is in a flip-up position, the shunt bar shorts the magnetic circuit resulting in a further decrease in magnetic flux conducted to the magnetically activated switch.

68. The method as claimed in claim 66, wherein the second set of flux conductors include upper transfer conductors and lower transfer conductors, the lower transfer conductors being in close proximity to the magnetically activated switch, the upper transfer conductors being in contact or in close proximity with the lower transfer conductors; and the first set of flux conductors include monorail strip conductors, vertical shoes, and rotary conductors, the monorail strip conductors being in contact or in close proximity with the upper transfer conductors and being T-shaped or dovetail shaped, the upper transfer conductors being adapted to slide along bottom portions of the monorail strip conductors in the second direction, the vertical shoes being in contact or in close proximity to a top portion of the monorail strip conductors;

the rotary conductors being in contact or in close proximity to the vertical shoes and being in close proximity to the first vertical transfer conductor and the second vertical transfer conductor only when the rotary conductors are rotationally aligned with the first vertical transfer conductor and the second vertical transfer conductor and the magnetic circuit is in a flip-down position.

69. The method as claimed in claim 65, the method further comprising:

turning on the night vision goggles with the magnetically activated switch assembly only when the night vision goggles are in a flip-down position and the rotary conductors are rotationally aligned with the first vertical transfer conductor and the second vertical transfer conductor.

* * * * *